United States Patent
Lai et al.

(10) Patent No.: US 8,646,379 B2
(45) Date of Patent: Feb. 11, 2014

(54) BREWED BEVERAGE APPLIANCE AND METHOD

(75) Inventors: Kin Man Lai, Shatin (HK); Kam Fai Fung, Tuen Mun (HK); Barbara Lynn Schnabel, Chappaqua, NY (US)

(73) Assignee: Conair Corporation, Stamford, CT (US)

( * ) Notice: Subject to any disclaimer, the term of this patent is extended or adjusted under 35 U.S.C. 154(b) by 24 days.

(21) Appl. No.: 13/231,035

(22) Filed: Sep. 13, 2011

(65) Prior Publication Data

US 2012/0121780 A1 May 17, 2012

Related U.S. Application Data

(60) Provisional application No. 61/413,744, filed on Nov. 15, 2010.

(51) Int. Cl.
*A47J 31/42* (2006.01)
*A47J 31/60* (2006.01)
*A47J 31/057* (2006.01)

(52) U.S. Cl.
CPC ............. *A47J 31/42* (2013.01); *A47J 31/605* (2013.01); *A47J 31/0573* (2013.01)
USPC ............................... 99/286; 426/433

(58) Field of Classification Search
USPC ............. 99/289 R, 285, 295, 297, 300, 302 P, 99/279; 426/433; 241/101.2, 258, 282.1, 241/282.2
See application file for complete search history.

(56) References Cited

U.S. PATENT DOCUMENTS

| | | | |
|---|---|---|---|
| 2,968,560 A | 1/1961 | Goros | |
| 4,389,925 A | 6/1983 | Piana | |
| 4,555,984 A * | 12/1985 | Yamashita | 99/286 |
| 4,784,050 A * | 11/1988 | Cavalli et al. | 99/289 R |
| 5,103,716 A * | 4/1992 | Mikkelsen | 99/289 R |
| 5,531,152 A | 7/1996 | Gardosi | |
| 5,615,601 A | 4/1997 | Eugstar | |
| 5,794,519 A | 8/1998 | Fischer | |
| 6,095,032 A * | 8/2000 | Barnett et al. | 99/286 |
| 6,345,570 B1 * | 2/2002 | Santi | 99/289 R |
| 7,219,596 B2 * | 5/2007 | Kief, Jr. | 99/289 R |
| 2003/0005826 A1 | 1/2003 | Sargent et al. | |
| 2006/0090653 A1 | 5/2006 | McDuffie et al. | |
| 2010/0303964 A1 * | 12/2010 | Beaulieu et al. | 426/77 |

FOREIGN PATENT DOCUMENTS

| | | |
|---|---|---|
| WO | 2007016977 A1 | 2/2007 |
| WO | 2007138016 A1 | 12/2007 |

* cited by examiner

*Primary Examiner* — Henry Yuen
*Assistant Examiner* — Thien S Tran
(74) *Attorney, Agent, or Firm* — McCormick, Paulding & Huber LLP

(57) ABSTRACT

A beverage appliance includes a housing having a liquid reservoir, a brewing station disposed within the housing and in fluid communication with the liquid reservoir, a grinding station disposed within the housing and being functionally separate from said brewing station, and a brewing carriage being selectively movable between a first position adjacent the grinding station and a second position adjacent the brewing station. Movement of the brewing carriage between the first and second position shifts a beverage ingredient in the brewing carriage from the first position to the second position and when the brewing carriage is in the in said second position, liquid is dispensed from the liquid reservoir and directed to the brewing carriage to produce a brewed beverage.

11 Claims, 45 Drawing Sheets

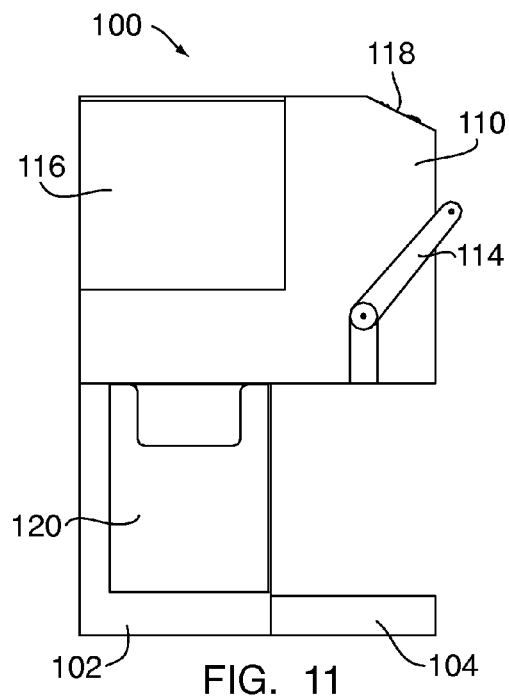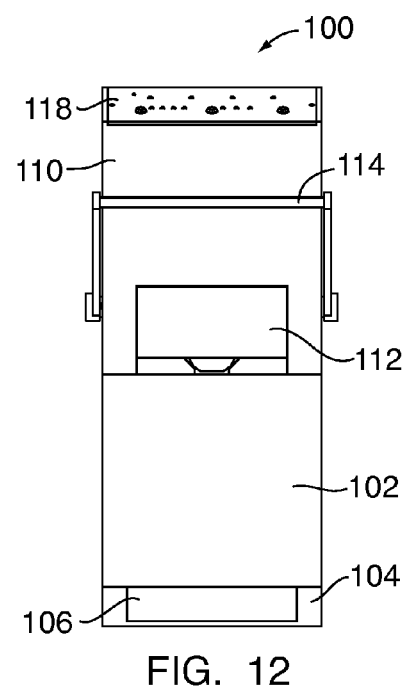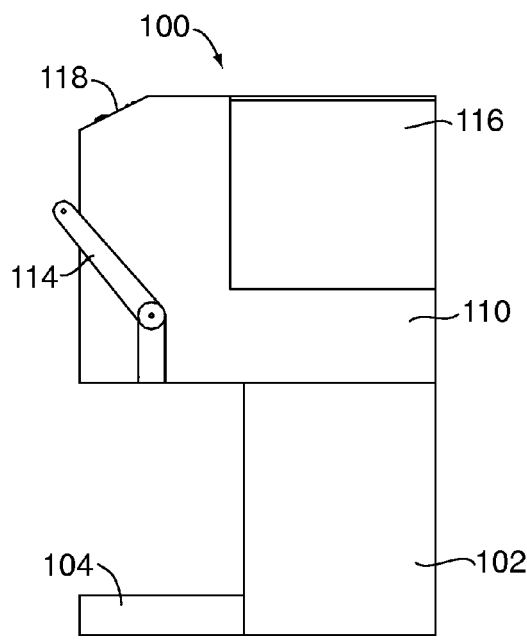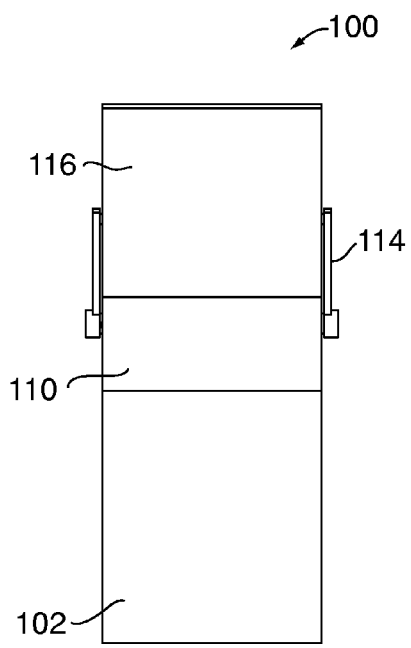

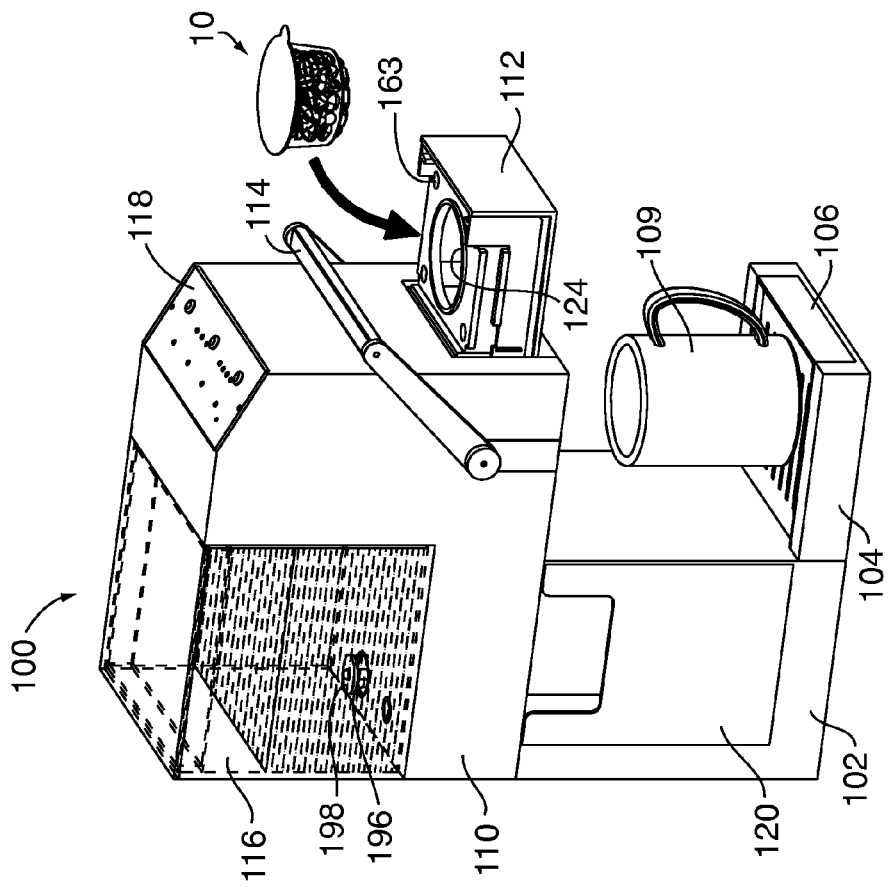
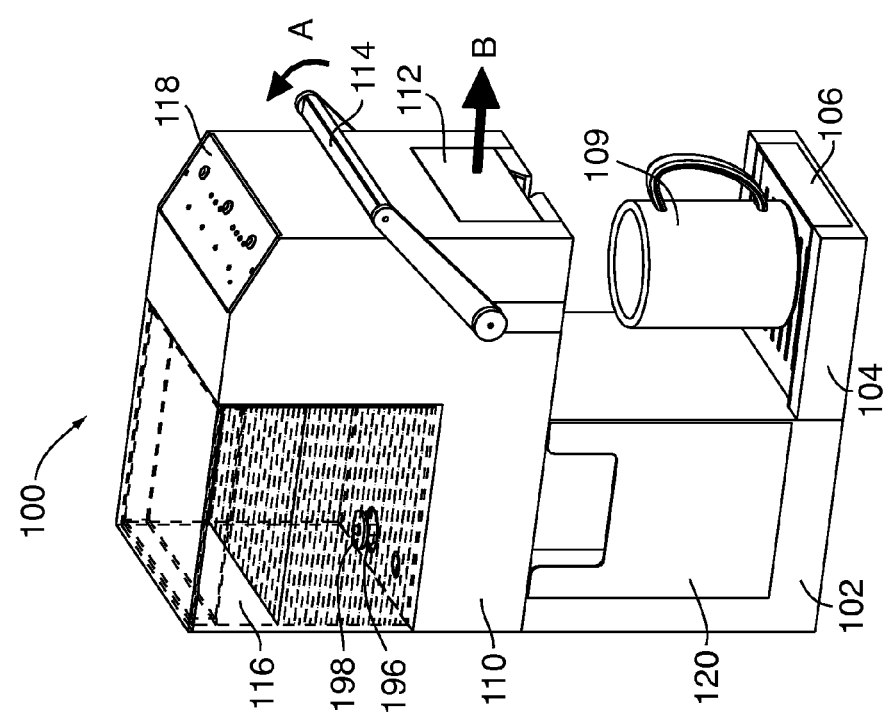

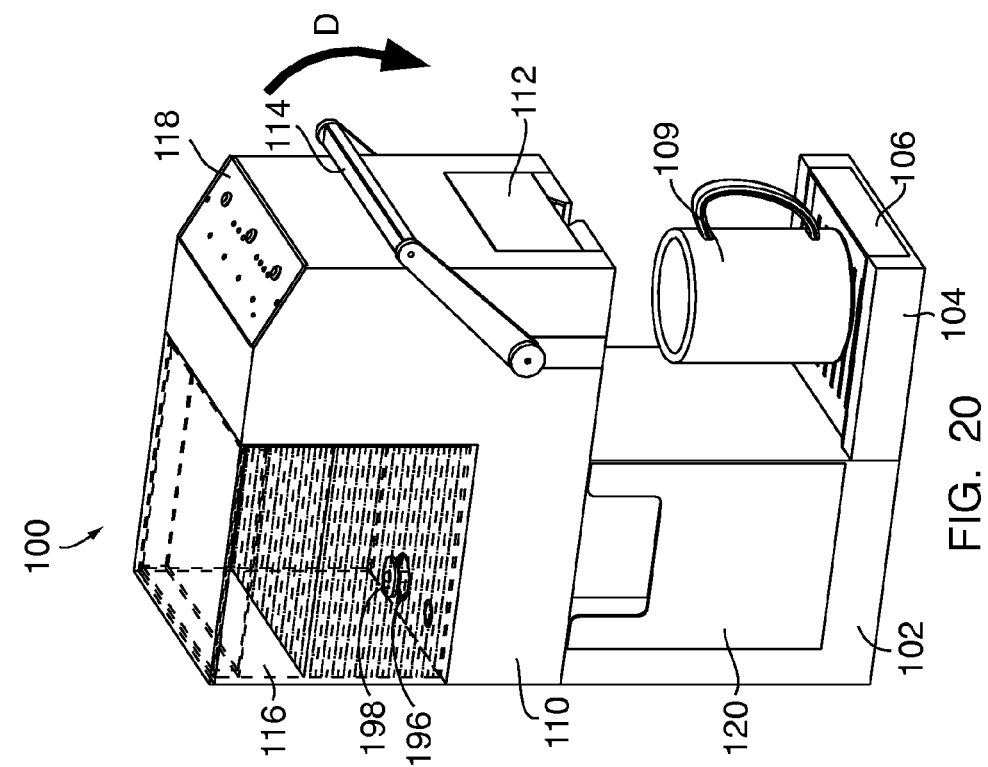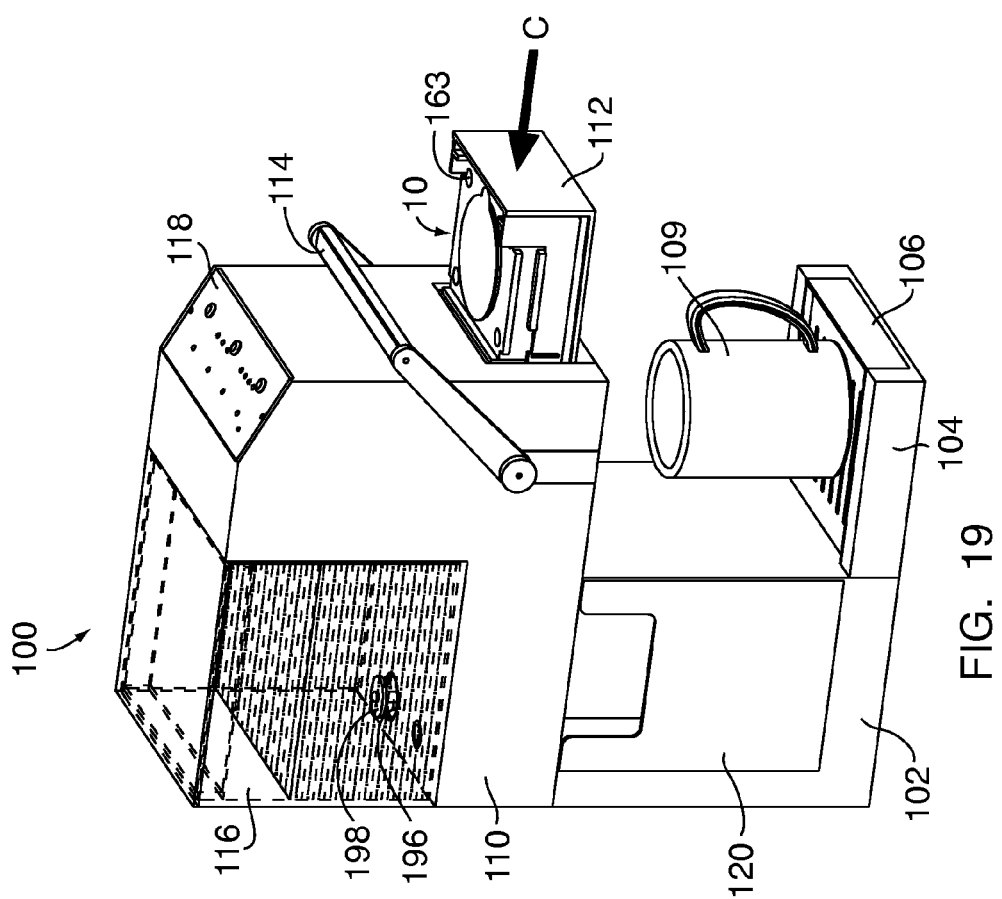

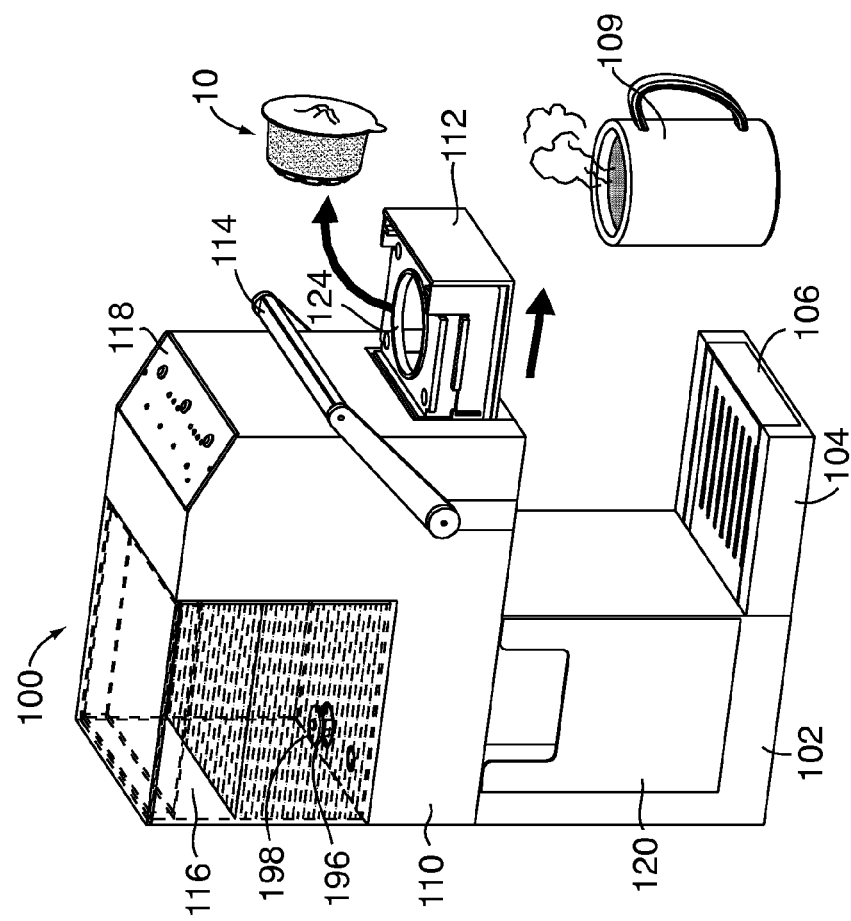
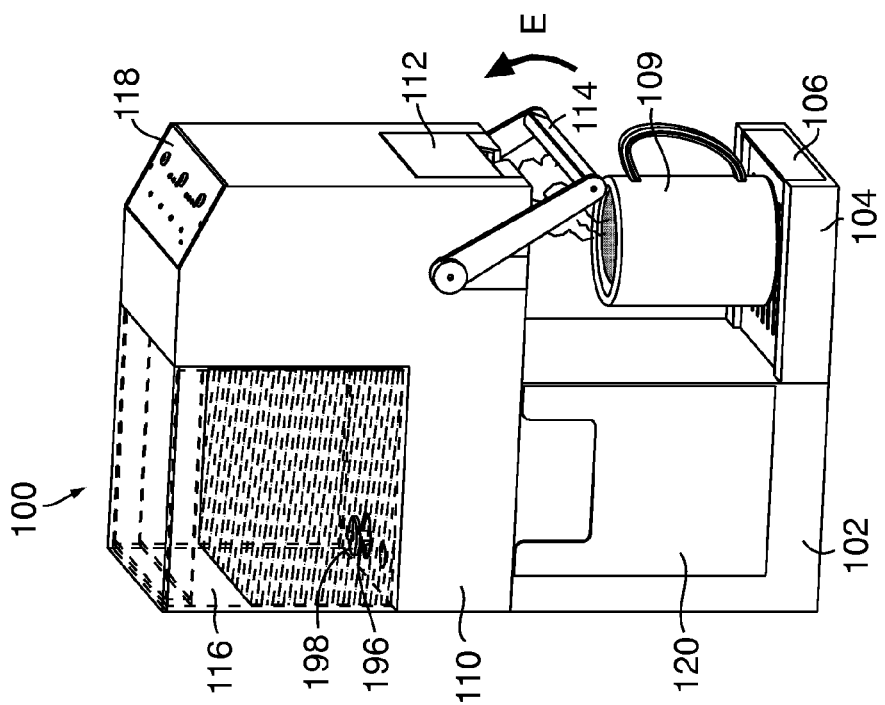

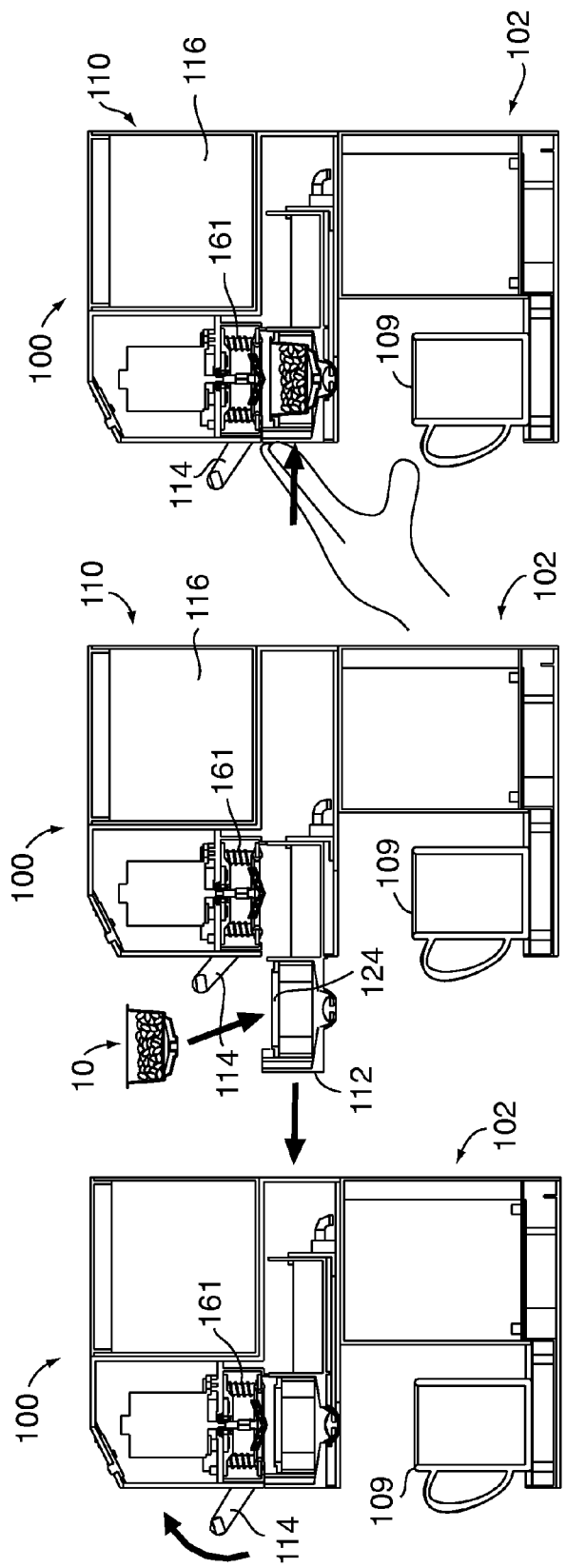

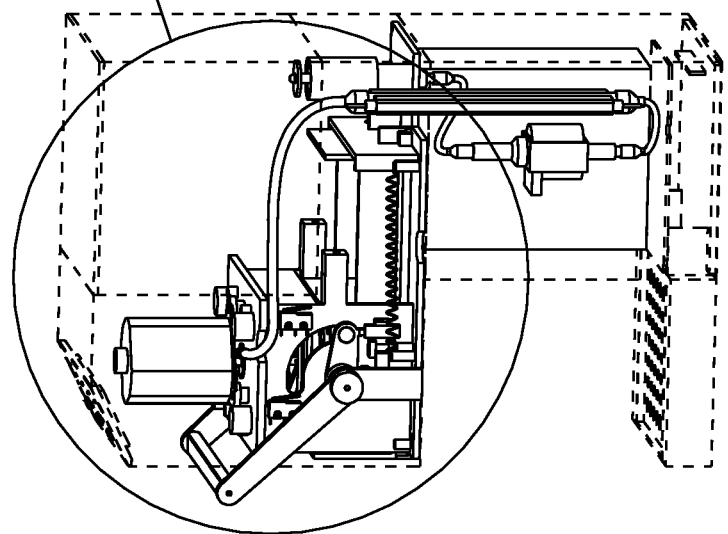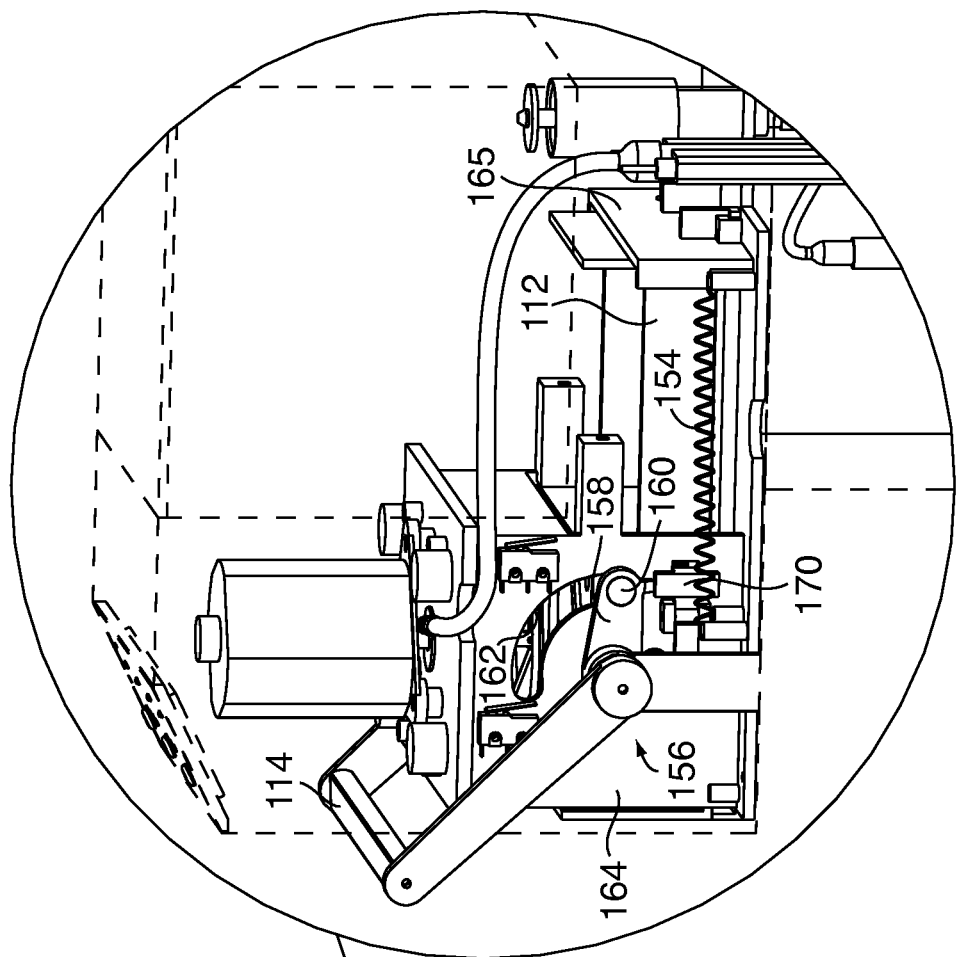
FIG. 34

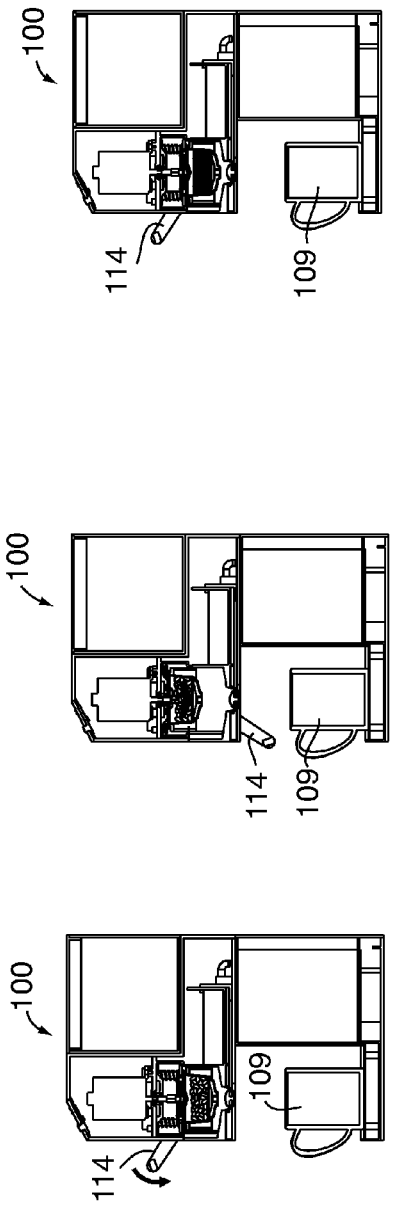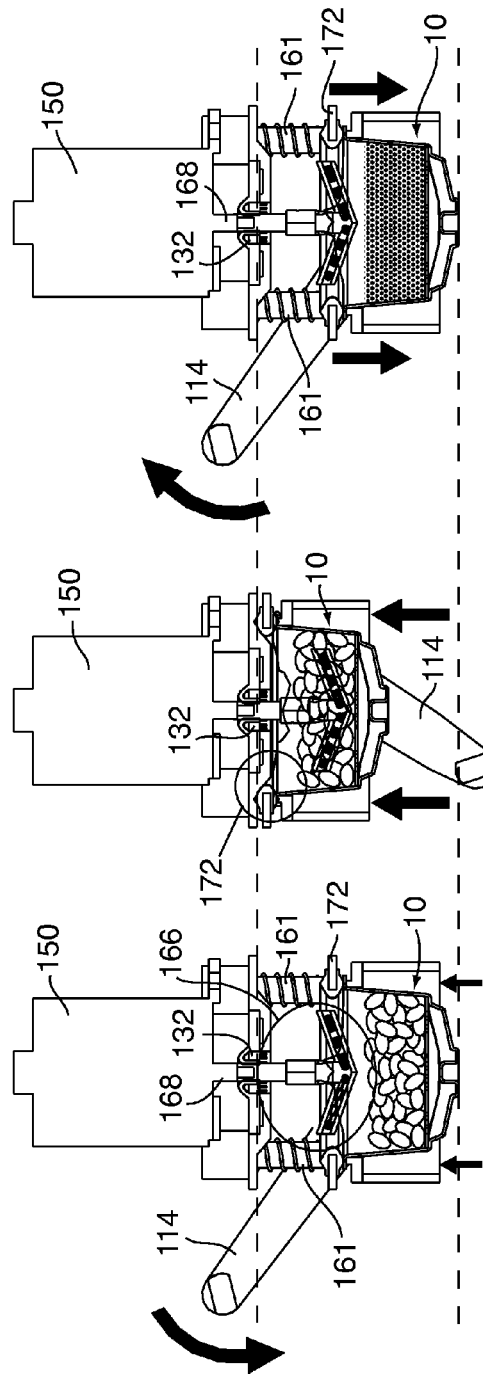

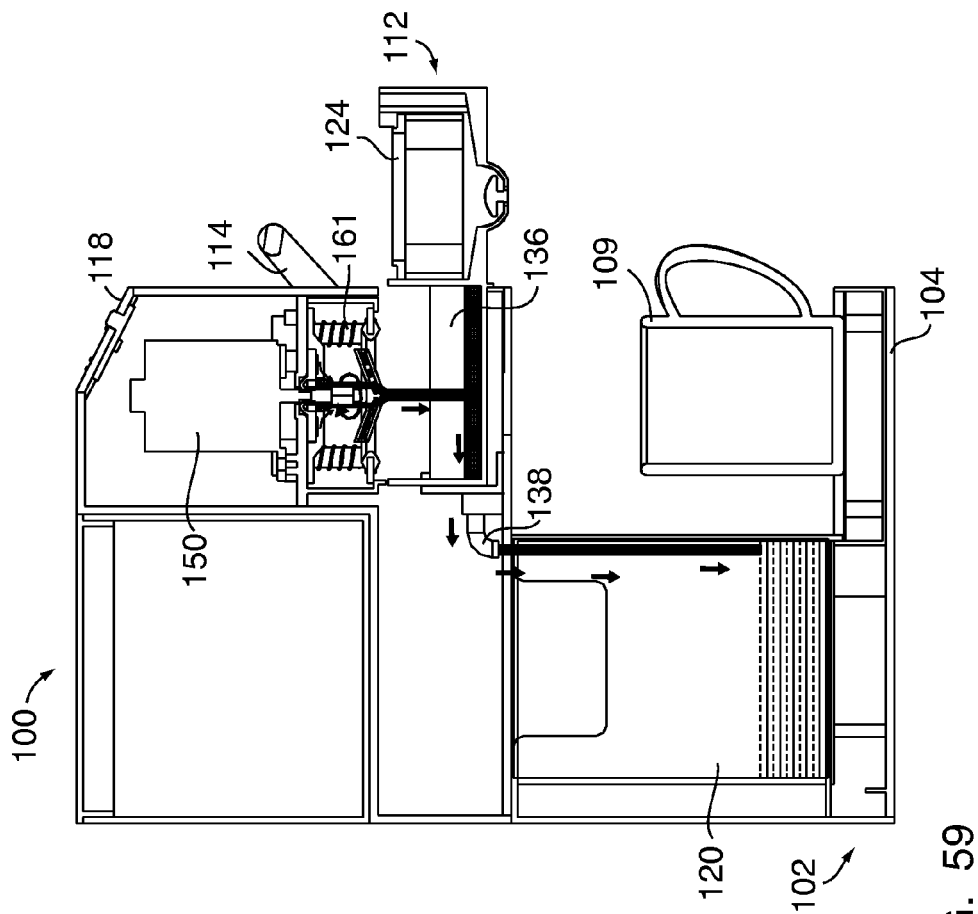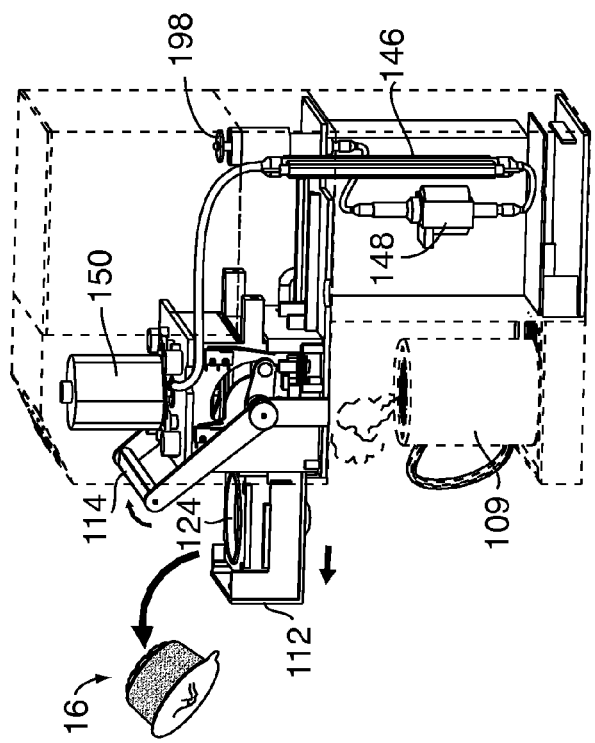
FIG. 59

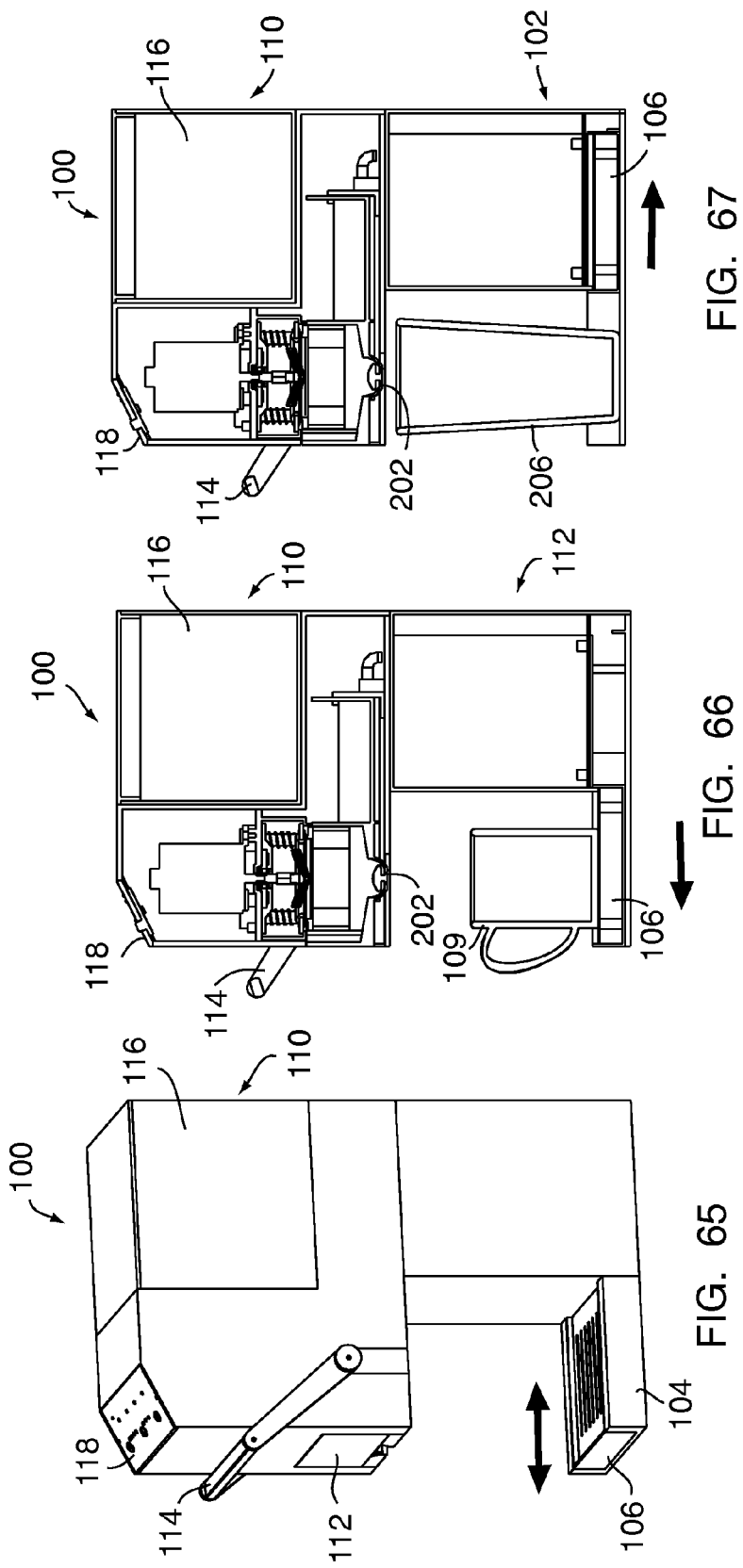

BREWED BEVERAGE APPLIANCE AND METHOD

CROSS-REFERENCE TO RELATED APPLICATIONS

This application claims the benefit of U.S. Provisional Application Ser. No. 61/413,744, filed on Nov. 15, 2010, which is herein incorporated by reference in its entirety.

TECHNICAL FIELD

The present invention relates to brewed beverage appliances and, more particularly, to a brewed beverage appliance adapted to brew coffee.

BACKGROUND OF THE INVENTION

Various known coffee making appliances involve adding of coffee beans in one of various forms (i.e., ground or unground) to a container that is part of a machine in which heated water is delivered to the container and passes therethrough. The container typically includes a filtering mechanism so that heated water exiting the container is in the form of brewed coffee. Certain appliances require pre-ground coffee beans to be added in the form of "grounds." Other appliances are designed to accept whole coffee beans into a hopper or opening and include mechanisms that grind the beans into a ground form and then complete the brewing process. It is sometimes preferred to keep whole beans on hand for making coffee so that the coffee may be ground immediately prior to brewing, as this is believed to produce the freshest tasting coffee beverage. Yet other appliances required use of pods or pre-packaged coffee grounds in a serving-sized filter container to be inserted into the appliance. In such instances, the pre-packaged pods or containers are limited to being filled with ground coffee. Certain pre-packaged containers require placement into a separate filter mechanism in the appliance, while others have built-in filtering mechanisms.

SUMMARY OF THE INVENTION

It is an object of the present invention to provide a brewed beverage appliance and related method that include the benefits of brewing coffee from whole beans that are ground immediately before brewing and that are contained in a convenient, disposable, single-serving package.

These and other objects are achieved by the present invention.

In an embodiment, a beverage appliance includes a housing having a liquid reservoir, a brewing station disposed within the housing and in fluid communication with the liquid reservoir, a grinding station disposed within the housing and being functionally separate from said brewing station, and a brewing carriage being selectively movable between a first position adjacent the grinding station and a second position adjacent the brewing station. Movement of the brewing carriage between the first and second position shifts a beverage ingredient in the brewing carriage from the first position to the second position and when the brewing carriage is in the in said second position, liquid is dispensed from the liquid reservoir and directed to the brewing carriage to produce a brewed beverage.

BRIEF DESCRIPTION OF THE DRAWINGS

FIG. 11 is a left side elevational view of the coffee appliance of FIG. 9.

FIG. 12 is a front elevational view of the coffee appliance of FIG. 9.

FIG. 13 is a right side elevational view of the coffee appliance of FIG. 9.

FIG. 14 is a rear elevational view of the coffee appliance of FIG. 9.

FIG. 17 is a perspective view of the coffee appliance of FIG. 9 illustrating a ready mode thereof.

FIG. 18 is a perspective view of the coffee appliance of FIG. 9 illustrating the loading of the whole coffee bean pre-packaged filter cup of FIG. 1.

FIG. 19 is a perspective view of the coffee appliance of FIG. 9 illustrating the whole coffee bean pre-packaged filter cup of FIG. 1 in a loading tray.

FIG. 20 is a perspective view of the coffee appliance of FIG. 9 in a loaded state.

FIG. 23 is a perspective view of the coffee appliance of FIG. 9 subsequent to brewing a cup of coffee.

FIG. 24 is a perspective view of the coffee appliance of FIG. 9 illustrating the removal of a spent pre-packaged filter cup subsequent to brewing.

FIG. 31 a cross-sectional, schematic view of the coffee appliance of FIG. 9 in a mode of operation.

FIG. 32 a cross-sectional, schematic view of the coffee appliance of FIG. 9 in another mode of operation.

FIG. 33 a cross-sectional, schematic view of the coffee appliance of FIG. 9 in another mode of operation.

FIG. 34 is an enlarged, detail view of a filter cup lifting mechanism and grinding motor of the coffee appliance of FIG. 9.

FIG. 35 is an enlarged, cross-sectional, schematic view of the coffee appliance of FIG. 9 in a mode of operation.

FIG. 36 is an enlarged, cross-sectional, schematic view of the coffee appliance of FIG. 9 in another mode of operation.

FIG. 37 is an enlarged, cross-sectional, schematic view of the coffee appliance of FIG. 9 in a mode of operation.

FIG. 59 is a schematic, cross-sectional view of the coffee appliance of FIG. 9 illustrating a cleaning mode.

won

FIG. 65 is a perspective view of a coffee appliance having a slidable drip tray according to the present invention.

FIG. 66 is a cross-sectional view of the coffee appliance of FIG. 65 showing the slidable drip tray in an extended position.

FIG. 67 is a cross-sectional view of the coffee appliance of FIG. 65 showing the slidable drip tray in a retracted position.

DETAILED DESCRIPTION OF THE PREFERRED EMBODIMENTS

Figure 1:
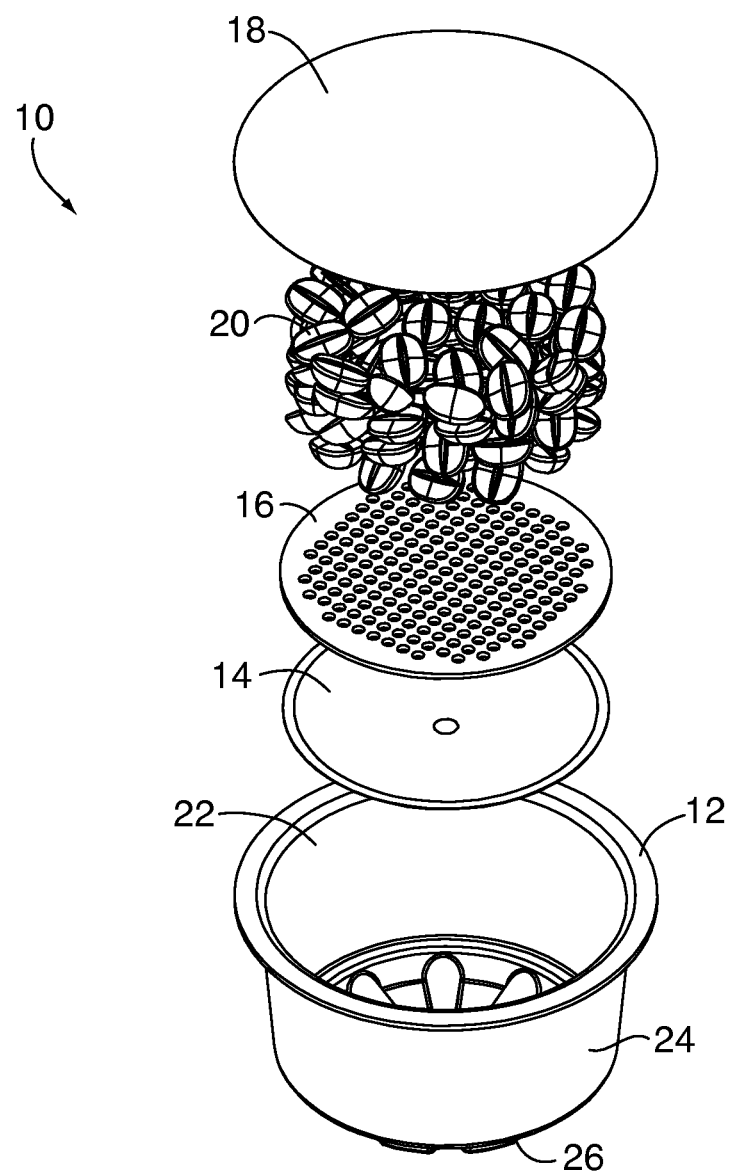
FIG. 1 is an exploded view of a whole coffee bean pre-packaged filter cup according to the present invention.
Figure 2:
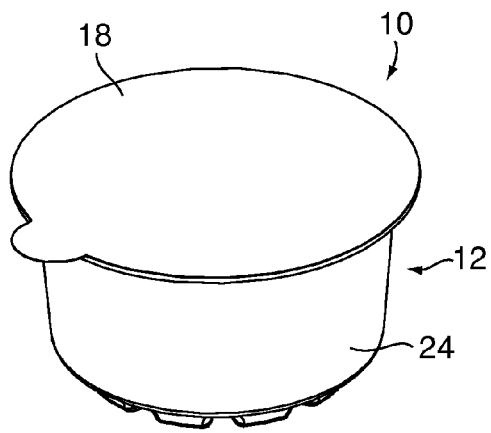
FIG. 2 is a perspective top view of the whole coffee bean pre-packaged filter cup of FIG. 1.
Figure 3:
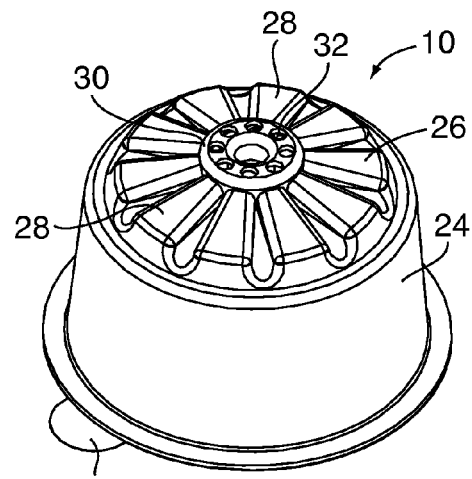
FIG. 3 is a perspective bottom view of the whole coffee bean pre-packaged filter cup of FIG. 1.
Figure 4:
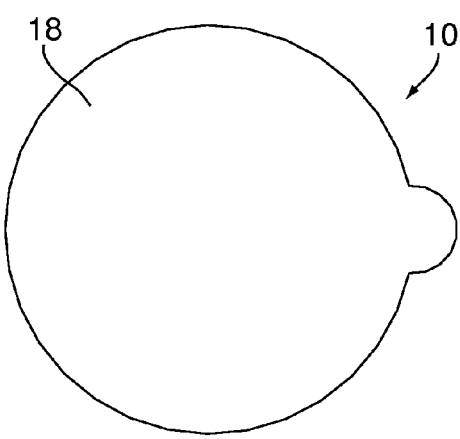
FIG. 4 is a top plan view of the whole coffee bean pre-packaged filter cup of FIG. 1.
Figure 5:
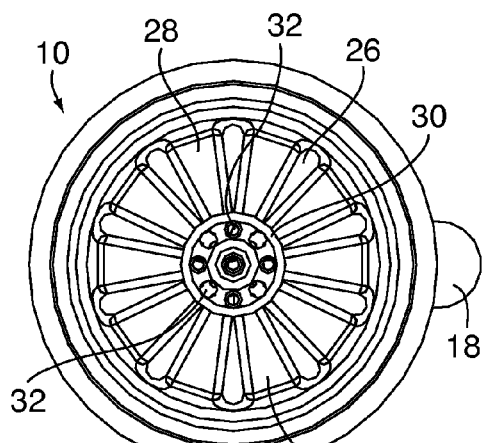
FIG. 5 is a bottom plan view of the whole coffee bean pre-packaged filter cup of FIG. 1.
Figure 6:
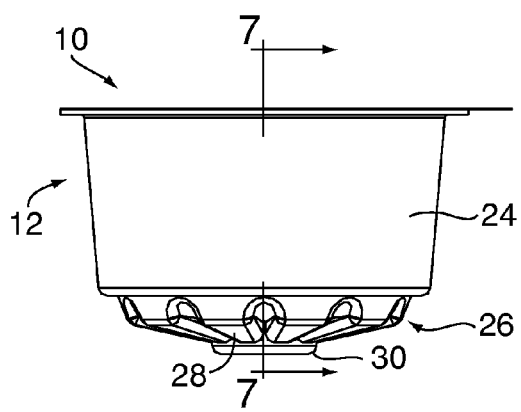
FIG. 6 is a side elevational view of the whole coffee bean pre-packaged filter cup of FIG. 1.

Referring to FIGS. 1-7, a filter cup 10 for use with an appliance according to the present invention includes a cup 12, a paper/fabric filter 14, a plastic screen 16 and a foil cover 18. The filter 14 prevents coffee grounds and other sediment from exiting the cup 12 during brewing but permits passage of liquid. The cover 18 may be formed from aluminum or other material known in the art, and is preferably heat-sealed or otherwise releasably affixed to the top rim of the cup 10. A plurality of whole coffee beans 20 are enclosed in the space between the foil cover 18 and the plastic screen 16. While FIG. 1 shows coffee beans housed in the filter cup 10, other types of food and substances, such as tea and the like, may be used in similar fashion to that described herein, without departing from the broader aspects of the present invention.

Figure 7:
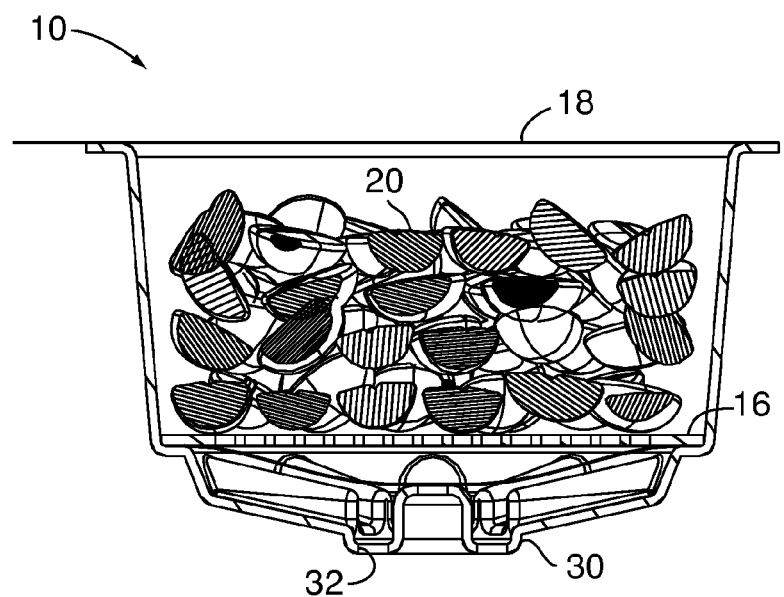
FIG. 7 is a side cross-sectional view of the whole coffee bean pre-packaged filter cup of FIG. 1 taken along line A-A of FIG. 6.

As further shown in FIG. 1, the cup 12 has an opening 22 at the top thereof, a circumferential sidewall 24 and a floor 26. As best shown in FIGS. 2-7, the floor 26 has a plurality of grooves or channels 28 that direct a flow of fluid to a circular depression or recess 30 having one or more apertures 32. Importantly, the recess 30 is the lowest portion of the cup 10 such that brewed coffee collects in the recess 30 and exits the cup through the apertures 32, as discussed hereinafter. FIG. 7 illustrates the cup 10 in an assembled state and containing coffee beans 20. As shown therein, the paper filter 14 is positioned on the floor 26 of the cup 12. The plastic screen 16 is positioned on top of the paper filter 14 and protects the paper filter 14 from abrasion caused by a grinding blade and/or coffee grounds. Both the paper filter 14 and the screen 16 are circular and sized to be closely received by the circumferential sidewall 24 of the cup at the bottom thereof. As best shown in FIG. 7, the screen 16 may be resilient and resistant to bending such that the screen 16 provides a flat surface in the cup 12 on top of which coffee bean 20 may rest. Importantly, the screen 16 prevents the coffee beans 20 from falling to the floor 26 of the cup 12 (which may be out of reach of a grinding blade) to facilitate optimal grinding by the grinding blade, as discussed in detail hereinafter. As discussed above, the foil cover 18 seals the filter 14, screen 16 and coffee beans 20 inside the cup 12.

The cup 10 may be stored and transported in a separate sealed package or wrapper for additional freshness and protection, and the apertures 32 in the floor 26 may be covered with, for example, an adhesive label (not shown). In the preferred embodiment, the filter cup 10 is a pre-packaged, single-use, disposable component. Thus, it is sealed by the foil cover 18 in an air-tight manner to preserve freshness and flavor and to protect the coffee beans 20 from moisture and contamination. As discussed above, the filter cup 10 may be sealed by the foil cover 18 and an adhesive label, or may be packaged in a wrapper with or without the adhesive label. In an alternative embodiment, it is contemplated that the filter cup 10 may instead be a re-usable cup that is re-filled for each use. In an embodiment, the floor 26 of the cup may be formed without apertures 32. In this embodiment, the floor of the cup 26 may be pierced by a needle upon insertion into a coffee appliance to provide an exit for the flow of brewed coffee.

Figure 8:
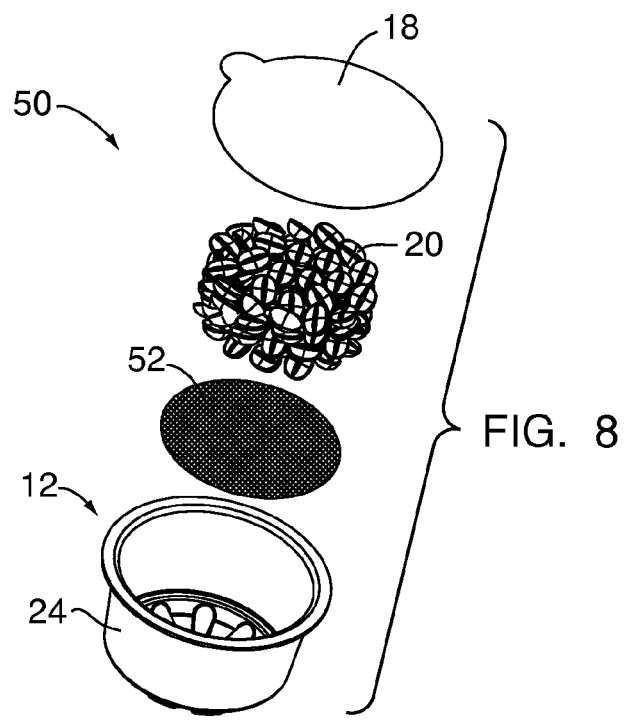
FIG. 8 is an exploded view of a whole coffee bean pre-packaged filter cup according to another embodiment of the present invention.

Referring now to FIG. 8, an alternative construction of a filter cup 50 is shown. As shown therein, the cup 50 is substantially similar in shape and construction as the cup 10, however, a metal mesh filter 52 may be utilized in place of the paper/fabric filter 14 and the protective plastic screen 16. In this embodiment, the metal mesh filter 52 is fine enough such that it prevents coffee grounds from exiting the cup 10 and also provides a level of abrasion resistance. While it is disclosed that the filter 34 may be formed from a metal mesh, other materials substantially resistant to abrasion from the grinding blade and/or coffee grounds may also be utilized without departing from the broader aspects of the present invention.

Referring to FIGS. 9-24, an appliance 100 according to an embodiment of the present invention is shown. The appliance 100 is intended to be used in combination with the filter cup 10, disclosed above, in order to brew a coffee or other beverage. As shown therein, the appliance 100 is generally rectangular in shape and comprises a base 102 and a drip tray housing 104 slidably receiving a drip tray 106 having a slotted or grated top surface 108. The surface 108 of the tray 106 is adapted to have a container, such as a coffee mug 109, placed upon it to receive brewed coffee as it is produced by and emitted from the appliance 100. As will be readily appreciated, the slotted surface 108 permits liquid that may be spilled from the cup 109 or that miss the cup 109 during operation to pass through the surface 108 and collect in the drip tray 106, for easy cleanup.

Figure 9:
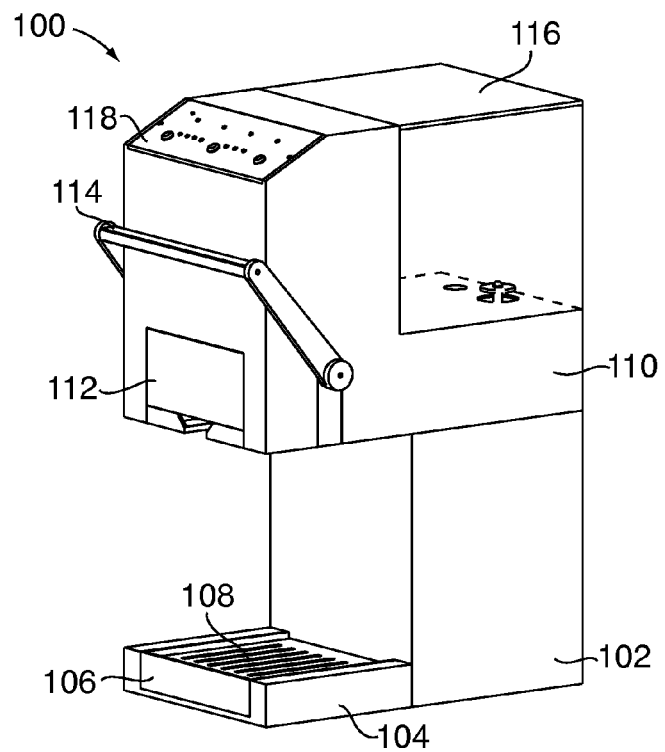
FIG. 9 is a perspective right side view of a coffee appliance according to the present invention.
Figure 10:
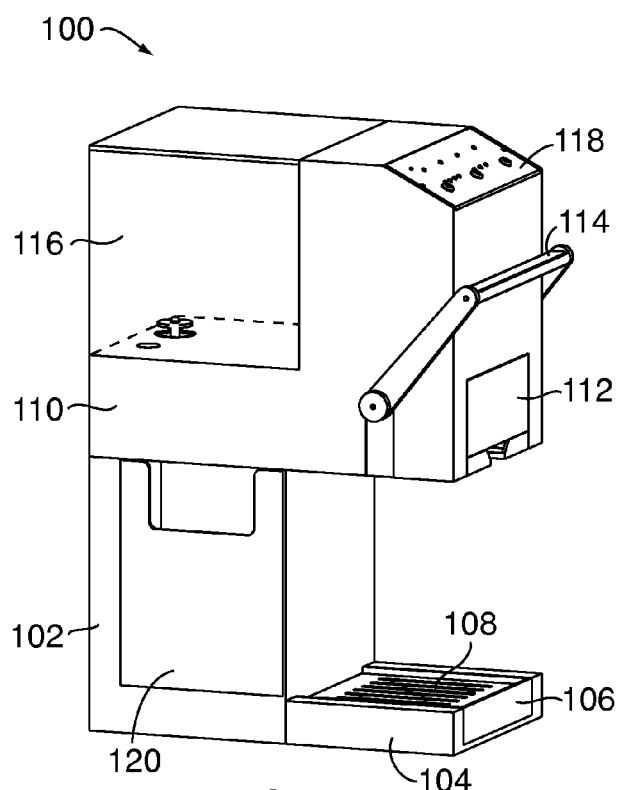
FIG. 10 is a perspective left side view of the coffee appliance of FIG. 9.
Figure 16:
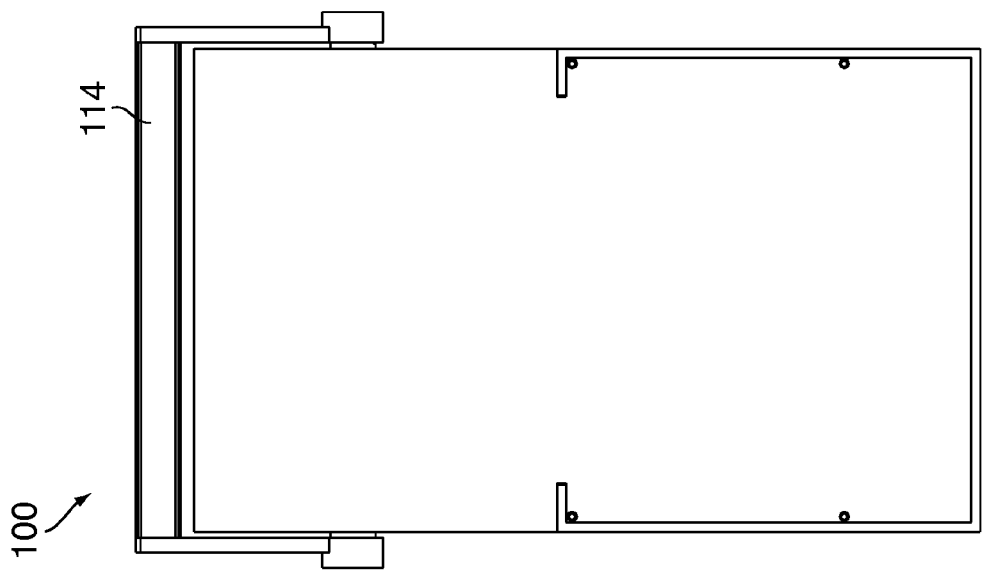
FIG. 16 is a bottom plan view of the coffee appliance of FIG. 9.
Figure 15:
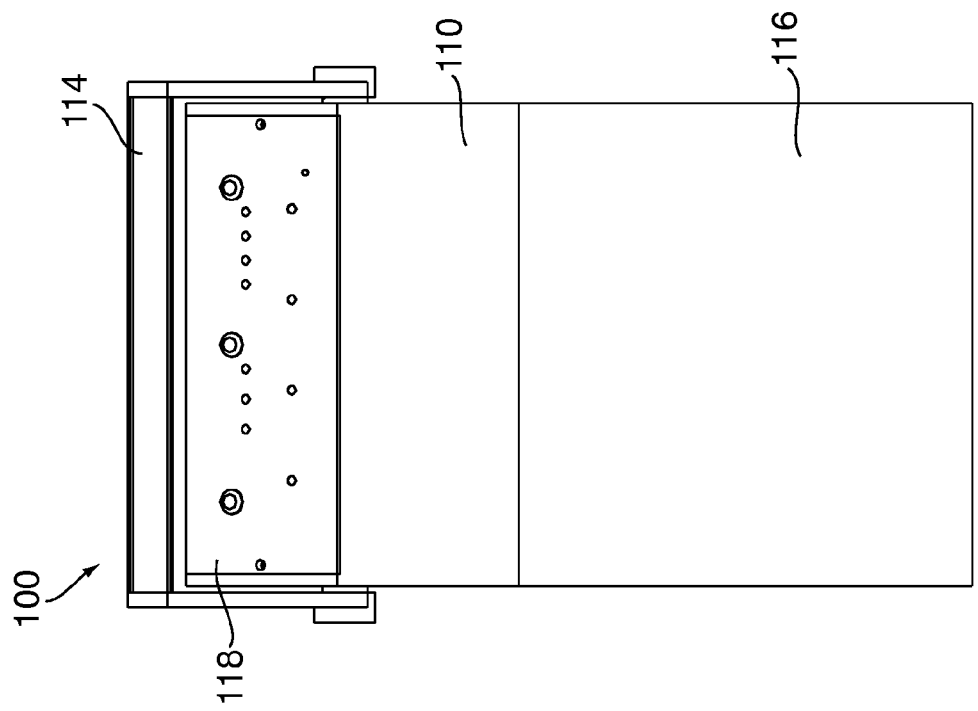
FIG. 15 is a top plan view of the coffee appliance of FIG. 9.

A housing 110 is located above, and supported by, the base 102 and slidably receives a filter cup housing/tray 112 for securing and positing the filter cup 10 during use. A handle 114 is pivotally mounted to the housing 110 for operation, as described below. As further shown in FIGS. 9 and 10, a water reservoir 116 is attached to, supported by, and otherwise forms a part of the housing 17. In an embodiment, the water reservoir 116 may be removably or permanently mounted to the housing 110. The housing 110 also includes a control panel 118 for controlling operational features of the appliance, as discussed hereinafter. As best shown in FIG. 9, the base 102 includes a recess on one side there for slidably receiving a discard tank 120 for receiving water from a cleaning operation of the appliance 100 (described below) and discarded filter cups 10 after use. In an alternative embodiment, the tray 112 may be pivotally received by the housing 110 and movable between a first position in which the housing/tray 112 is received within the housing, and a second position in which the tray 112 is pivoted away from the housing and towards a user to facilitate the installation of a filter cup 10. In an embodiment, the tray 112 is removable from the housing 110 for cleaning.

Operation of the appliance 100 will now be described with specific reference to FIGS. 17-24. First, the water reservoir 116 is filled with water. A user then selects the desired coffee settings from the control panel 118. Settings may include selectable options such as coffee strength and serving size, timer setting, automatic brew, etc. The handle 114 is then moved upwardly in the direction of arrow A, as shown in FIG. 17, in order to unlock the tray 112 from its seated and retained position within the housing 110. The tray 112 slides out from the appliance 100 in the direction of arrow B to the position shown in FIG. 18, under force of a spring 154. In this position, the tray 112 is ready for a filter cup 10 to be placed into the receiving bracket 124 in the tray 112.

After the cup 10 is inserted into the tray 112, the tray 112 is now ready to be pushed back into the appliance 100 in the direction of arrow C, as shown in FIG. 19. In particular, the tray 112 is pushed manually back into the appliance 100 so that it is received by the housing 110 in locked position, as shown in FIG. 20. The handle 114 is then lowered in the direction of arrow D in order to automatically initiate the grinding and brewing processes.

Figure 21:
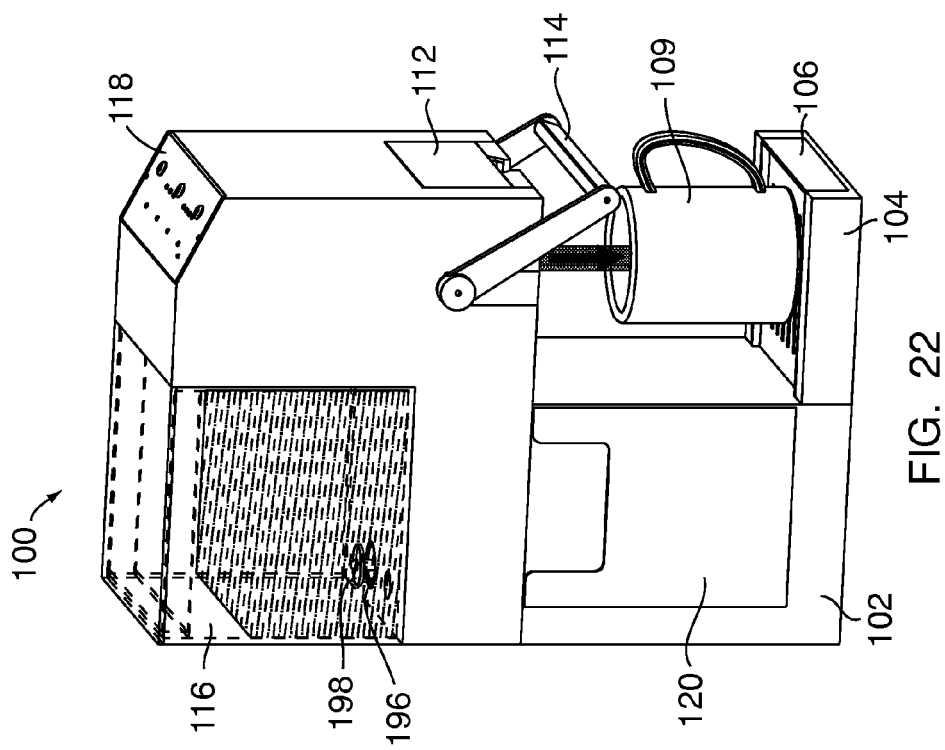
FIG. 21 is a perspective view of the coffee appliance of FIG. 9 in a brew-ready state.

Referring to FIG. 21, as noted above, the grinding process starts automatically after the handle 114 is lowered. In the process, the coffee beans 20 in the filter cup 10 are ground by a grinding blade 126 that is received within the cup 10 so that the beans 20 are turned into coffee grounds 128. After grinding is completed, heated water is delivered into the cup 10 from a water outlet described hereinafter. As represented by the arrow 130 in FIG. 22, coffee is emitted from the bottom of the tray 112, which has an opening to enable such emission, into the coffee mug 109 positioned beneath the tray 112.

After the brewing process is complete, the handle 114 is raised from the position shown in FIG. 23 in the direction of arrow E to the position shown in FIG. 24. Again, movement of the handle 114 to its upper position unlocks the tray 112 so that it slides out of the housing 110 appliance 100, permitting the user to manually remove the used filter cup 10 from the tray 112. The cup 110 may then be discarded into the discard tank 120. The filled mug 109 of coffee may be removed from the drip tray 106 before or after this step.

In an embodiment, while the tray 112 is in the out position, as shown in FIG. 24, a blade cleaning operation automatically begins. In the blade cleaning operation water is emitted from the water outlet 132. Because the cup 10 has been removed, the blade is surrounded by space thereby enabling the flowing water to rinse it clean. In an embodiment, the blade may rotate during application of water to facilitate cleaning. Since the tray 112 is in the out position, the water will not drain out of the bottom of the cup 10 and tray 112, as it does in the brewing mode. Instead, the water is diverted because it falls into the rear end 134 of the tray 112 into a collection pan 136, as is shown in FIG. 59. The water exits from the collection pan 136 of the tray 112 via a discard tube 138 and falls into the discard tank 120.

In an alternative embodiment, a cup containing a cleaning liquid such as water may be utilized to clean the blade 166 either periodically or after each use. In this embodiment, a cleaning cup is inserted into the receptacle 124 and the appliance 100 is actuated by pulling the handle 114 downward. The appliance 100 may then run a normal brewing cycle. Alternatively, a button on the control panel 118 may be depressed to run a cleaning cycle. The cleaning cycle may be specifically configured, e.g., water temperature, run time, blade rotation speed, to optimize blade cleaning and sterilization. In alternative embodiments, the cleaning cup may contain a cleaning solution or a slurry of cleaning ingredients. The cleaning ingredients may be liquid or dry and may take the form of granules, powder, etc.

In yet another embodiment, a cleaning operation may including running a brewing cycle without actually inserting a filter cup 10. In this embodiment, the handle 114 may be moved downward to begin the cycle such that heated water is passed over the stationary or rotating blade 166 to clean the blade. Alternatively, a button on the control panel 118 may be depressed to initiate the cleaning cycle.

Figure 62:
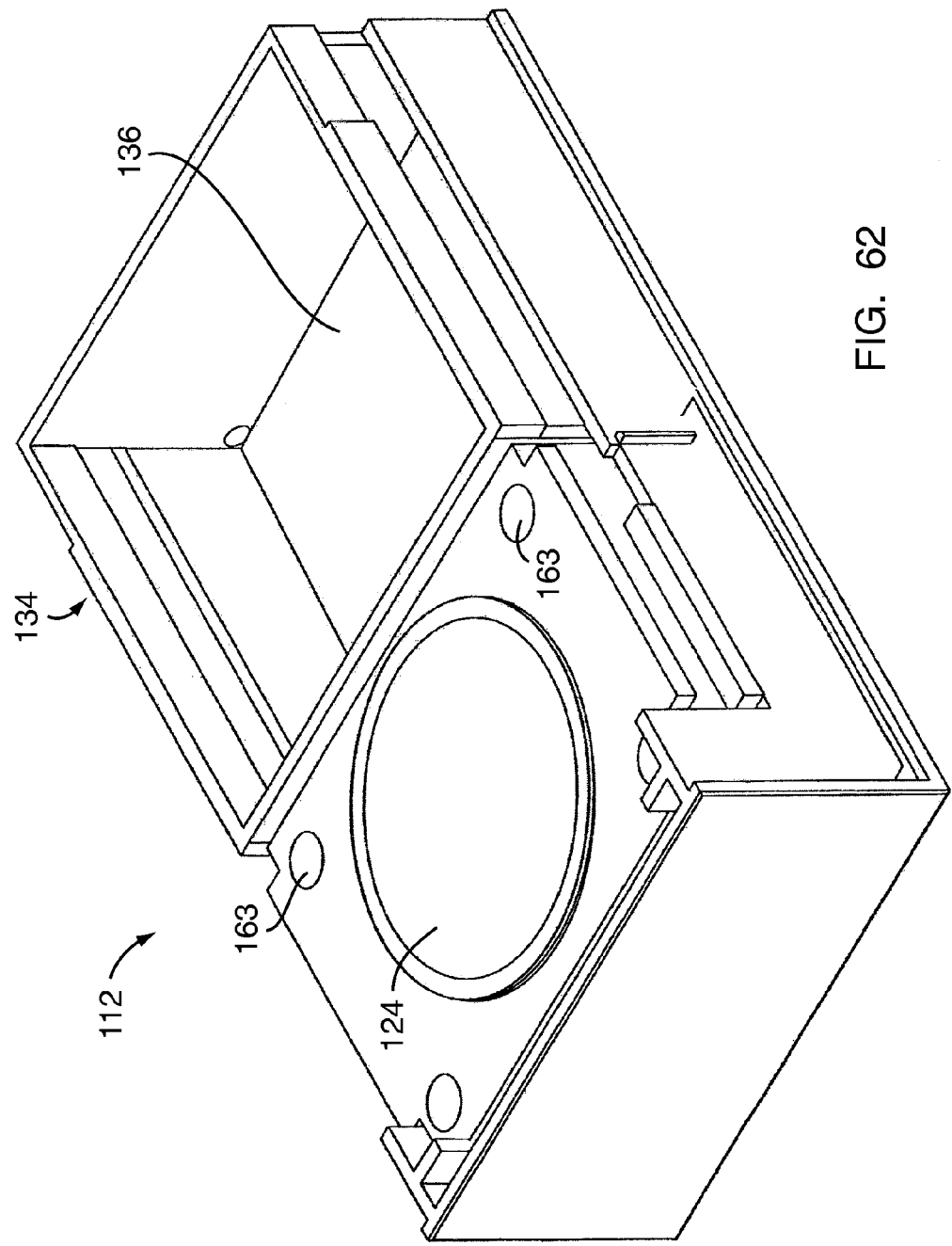
FIG. 62 is a perspective view of a tray for receiving the whole coffee bean pre-packaged filter cup of FIG. 1.
Figure 63:
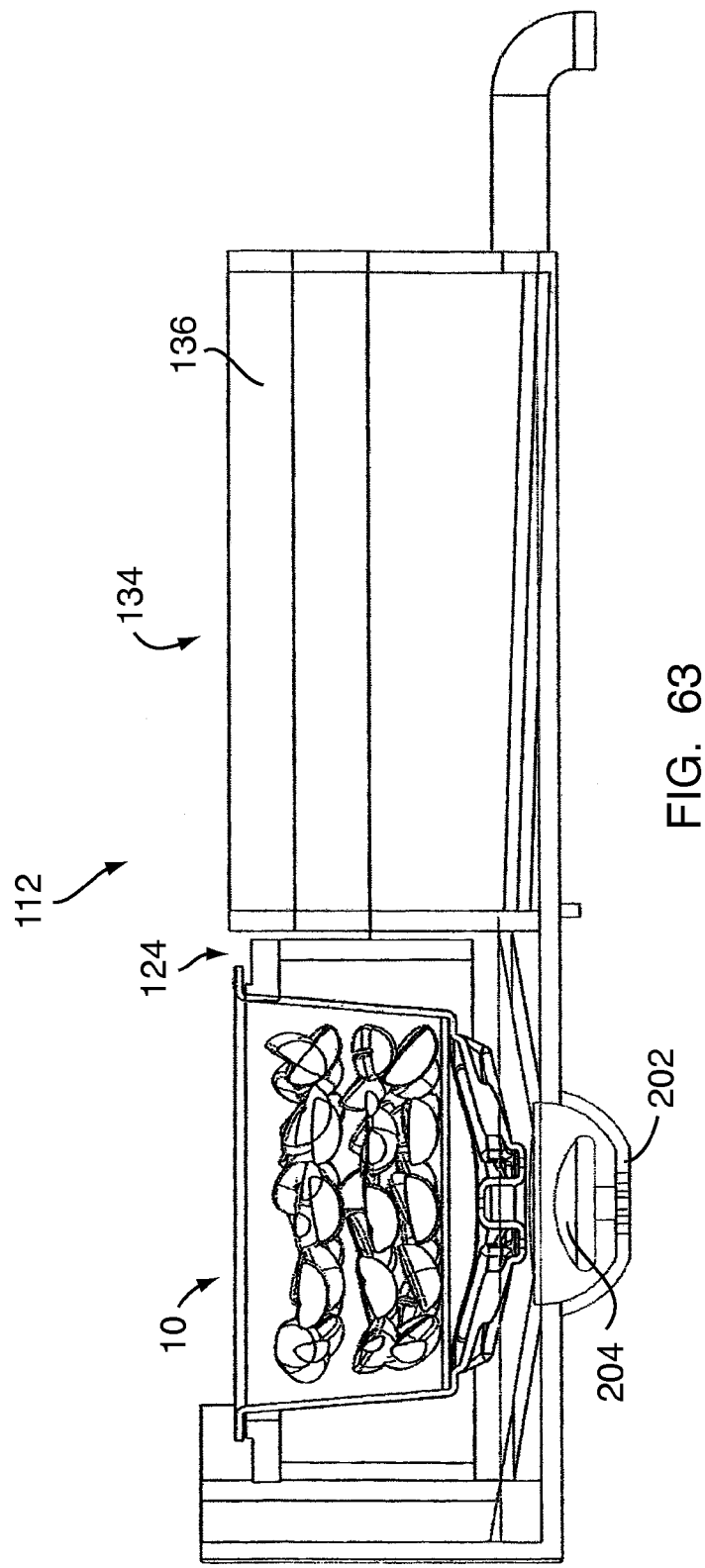
FIG. 63 is a side, cross-sectional view of the tray of FIG. 62.
Figure 64:
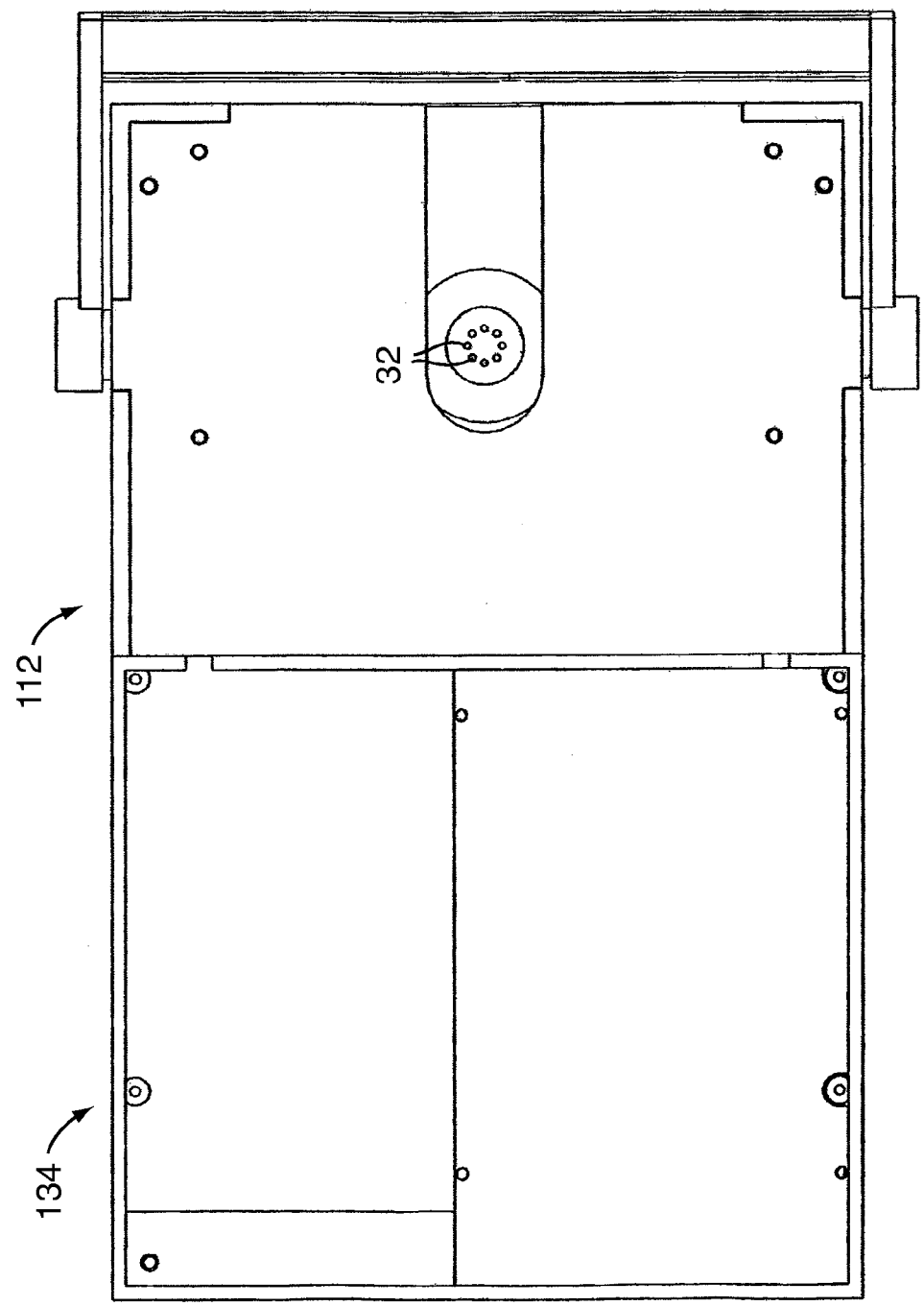
FIG. 64 is a bottom plan view of the tray of FIG. 62.*view* of a tray component of an appliance according to the present invention.

FIGS. 62 and 63 illustrate the tray 112 and the collection pan 136. FIG. 64 illustrates the bottom view of the tray 112 and shows the openings 32 of the cup 10 as viewed through an opening 140 in the bottom of the tray 112 that permits brewed coffee to flow out.

Figure 25A:
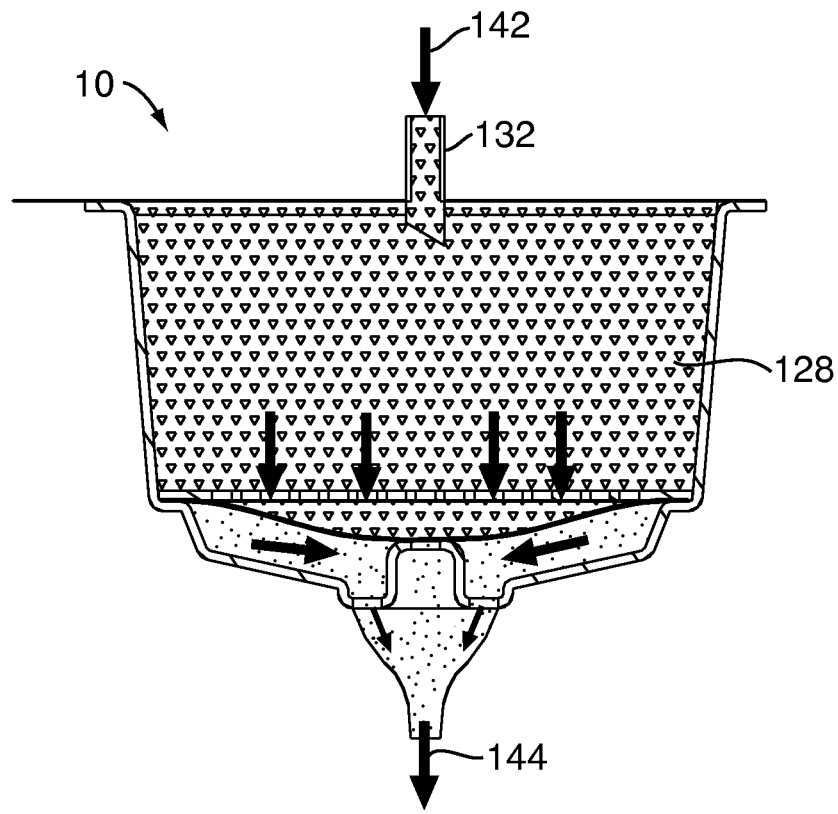
FIG. 25A is a schematic view of the whole coffee bean pre-packaged filter cup of FIG. 1 illustrating water flowing through during a brewing mode.

FIG. 25A schematically illustrates how ground coffee 128, which is ground from whole coffee beans 20 in a procedure described below, is infused with heated water to produce coffee. The ground coffee 128 is located in the cup 10 and heated water is introduced from above through a water outlet 132 as indicated by the arrow 142. The heated water flows through the ground coffee 128 in the cup 10 and exits from the apertures 32 in the bottom of the cup 10 as shown by arrow 144.

Figure 22:
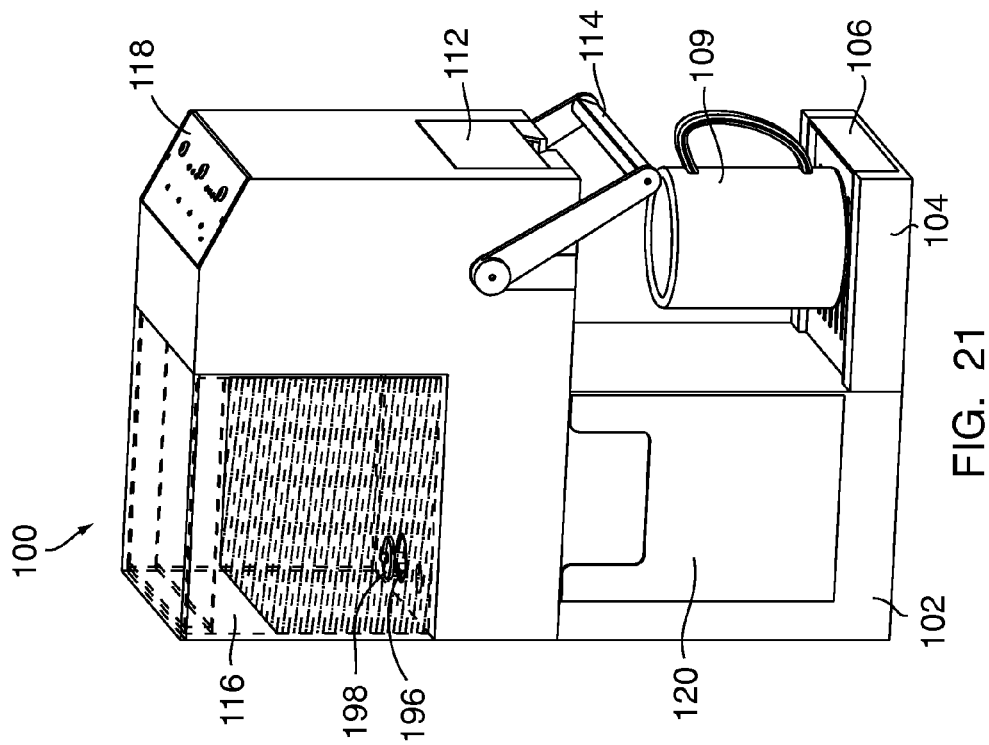
FIG. 22 is a perspective view of the coffee appliance of FIG. 9 during brewing/operation.
Figure 26:
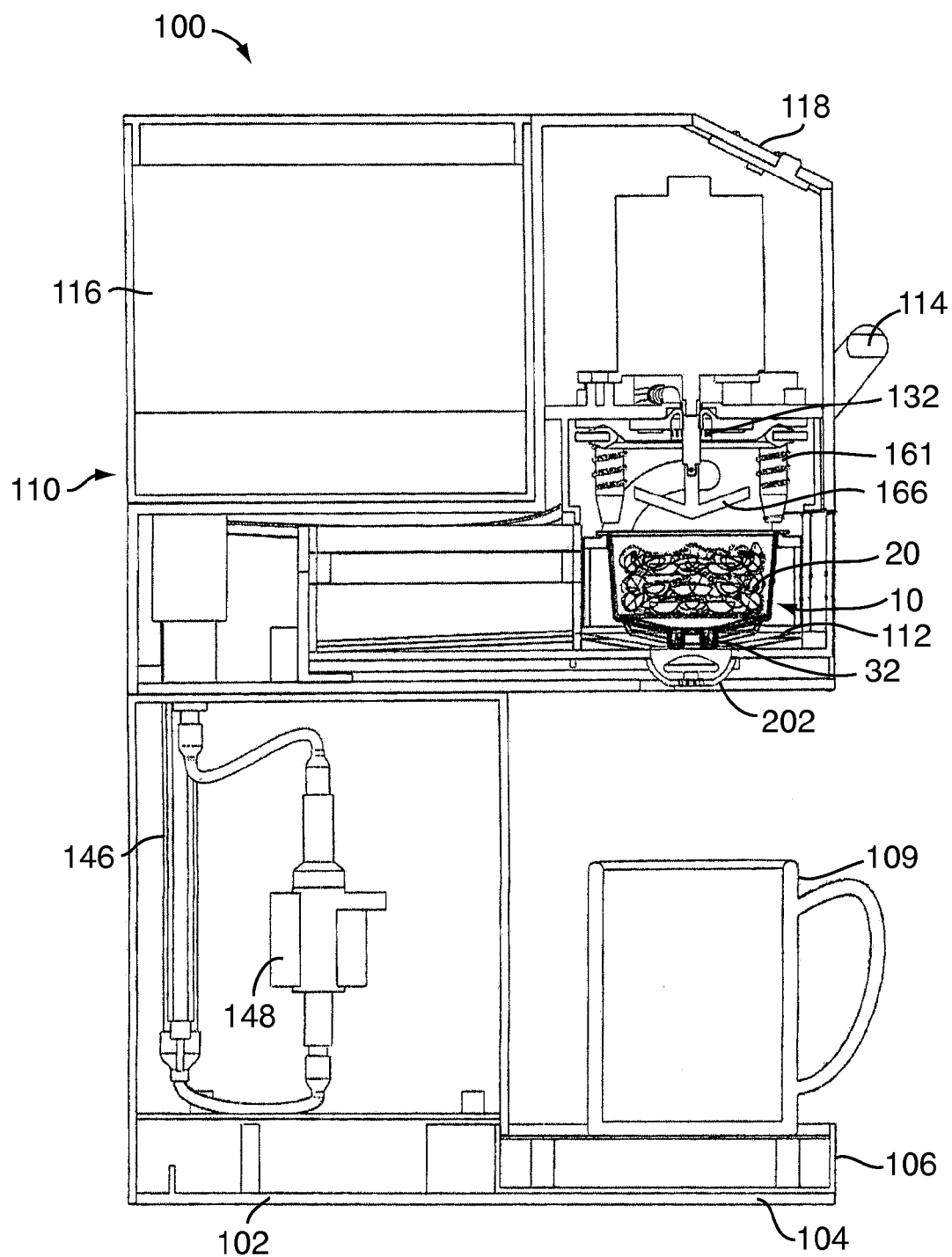
FIG. 26 is a first, side cross-sectional view of the coffee appliance of FIG. 9 in a first mode.
Figure 27:
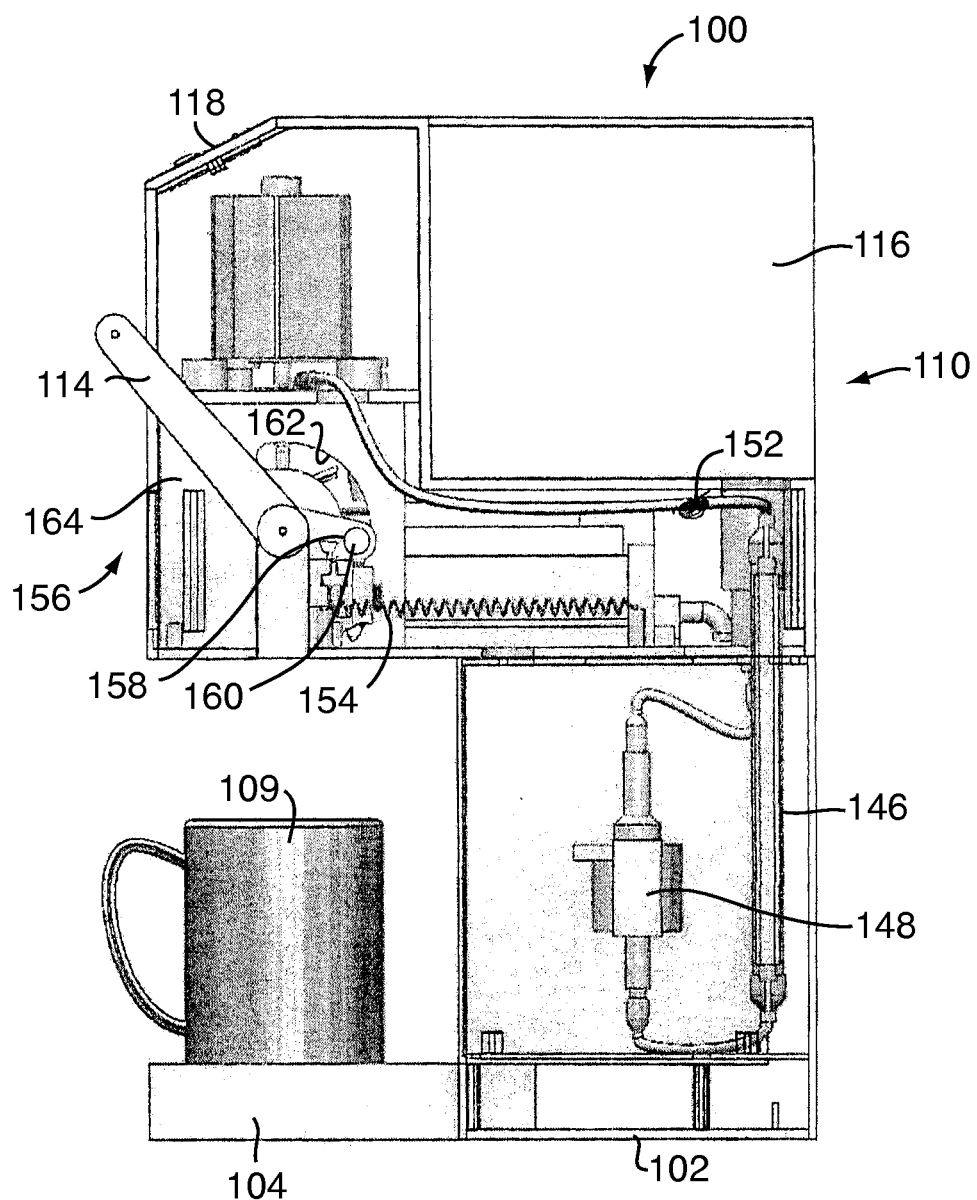
FIG. 27 is a second, side cross-sectional view of the coffee appliance of FIG. 9 in a first mode.

FIGS. 26 and 27 illustrate certain internal components of the appliance 100. As shown therein, the water reservoir 116 is filled with water. The tray 112 is withdrawn to permit placement of a cup 10 into a receiving bracket 124 in the tray 112, as shown in FIGS. 18 and 19. The tray 112 is then pushed back into the appliance to the position shown in FIG. 20. The handle 113 is then moved downwardly, as shown in FIGS. 21 and 22. Such movement of the handle 114 causes the cup 10 to be raised upwardly for grinding of the coffee beans 20 in the cup 10, as described below. The appliance 100 includes a heater 146 and pump 148 to heat water from the reservoir 116 and route it through a supply conduit to perform a brewing operation as described with reference to FIG. 25A. As shown in FIGS. 26-29, a grinder motor 150 is positioned in the housing 110 of the appliance 100 to carry out grinding of the coffee beans 20 in a manner described below. A hot water tube 152 carries heated water from the heater 146 to the water outlet 132 located above the tray 112.

Figure 29:
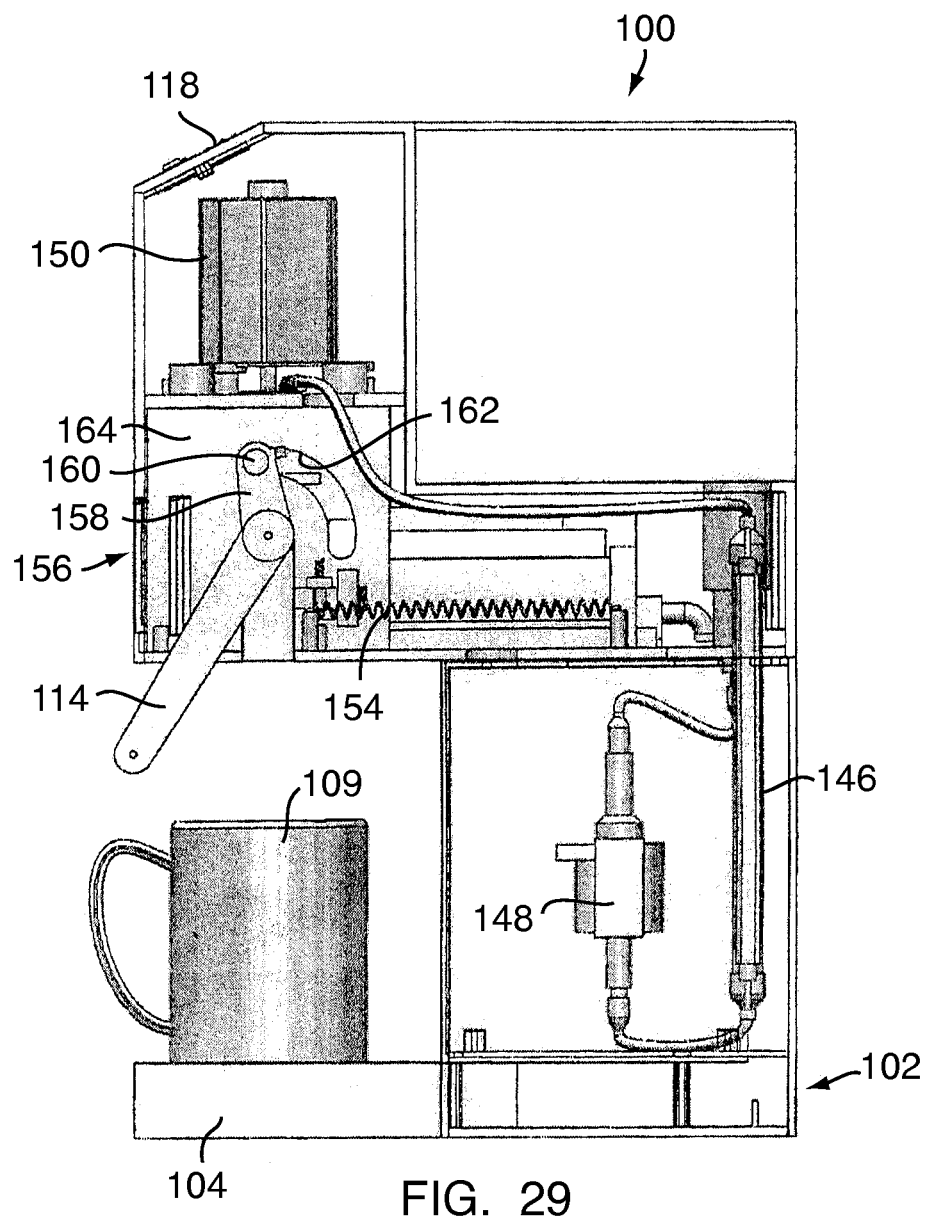
FIG. 29 is a second, side cross-sectional view of the coffee appliance of FIG. 9 shown in a second mode.

As best shown in FIGS. 27 and 29, lifting mechanism 156 is activated by the handle 114 in order to cause movement of the cup 10 between a lowered position and a raised position. The mechanism 156 includes a linkage arm 158, a pin 160 operatively attached to the receiving bracket 124 of the tray 112 and associated slot 162, and a plate 164 in which the slot 162 is located. In operation, upon moving the handle 114 in the downwards direction, pin 160 follows the path of the slot 162 and causes the cup 10 and the receiving bracket 124 to be lifted upwards into the grinding blade. Guideposts 161 are received in bore holes 163 of the receiving bracket to ensure proper orientation and alignment of the cup 10 with the grinding blade. Lowering of the cup 10 follows the reverse process.

Figure 28:
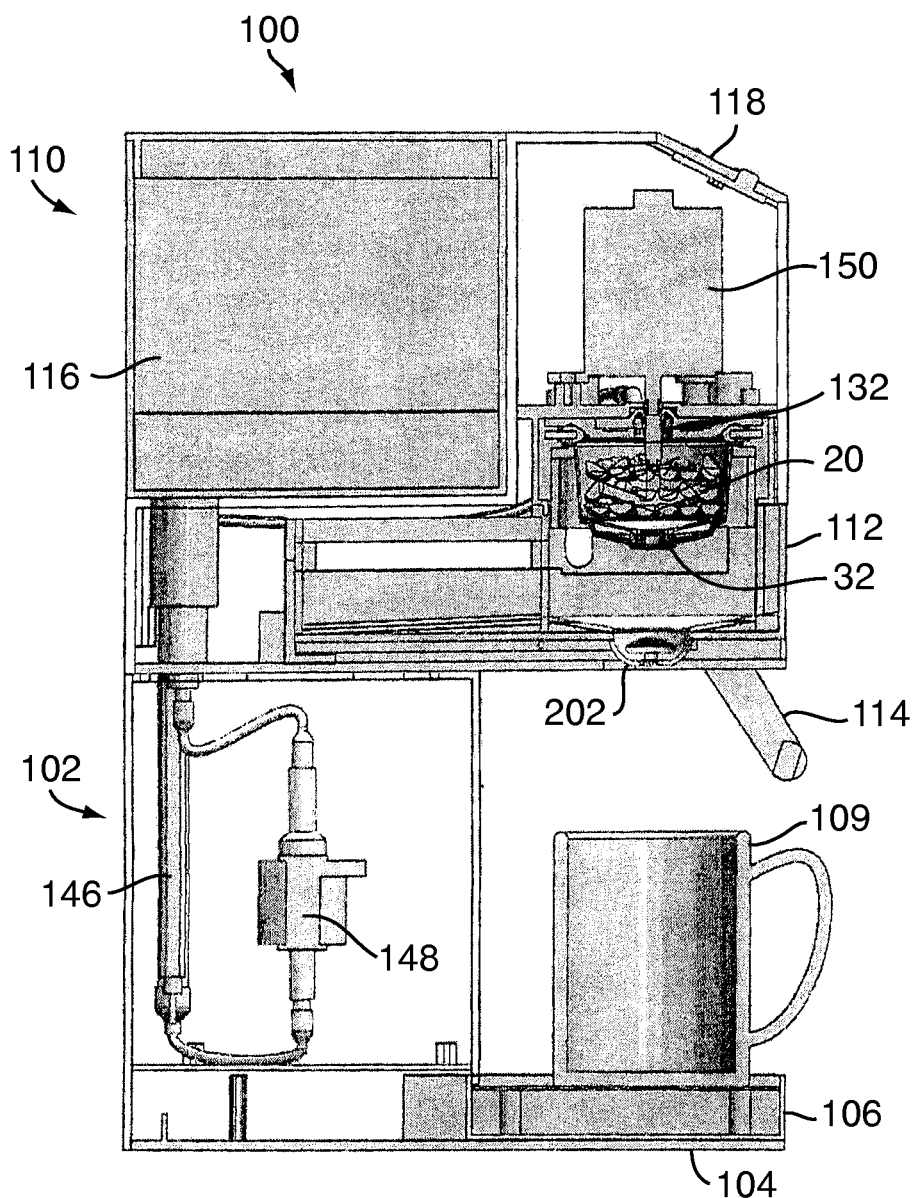
FIG. 28 is a first, side cross-sectional view of the coffee appliance of FIG. 9 shown in a second mode.
Figure 30:
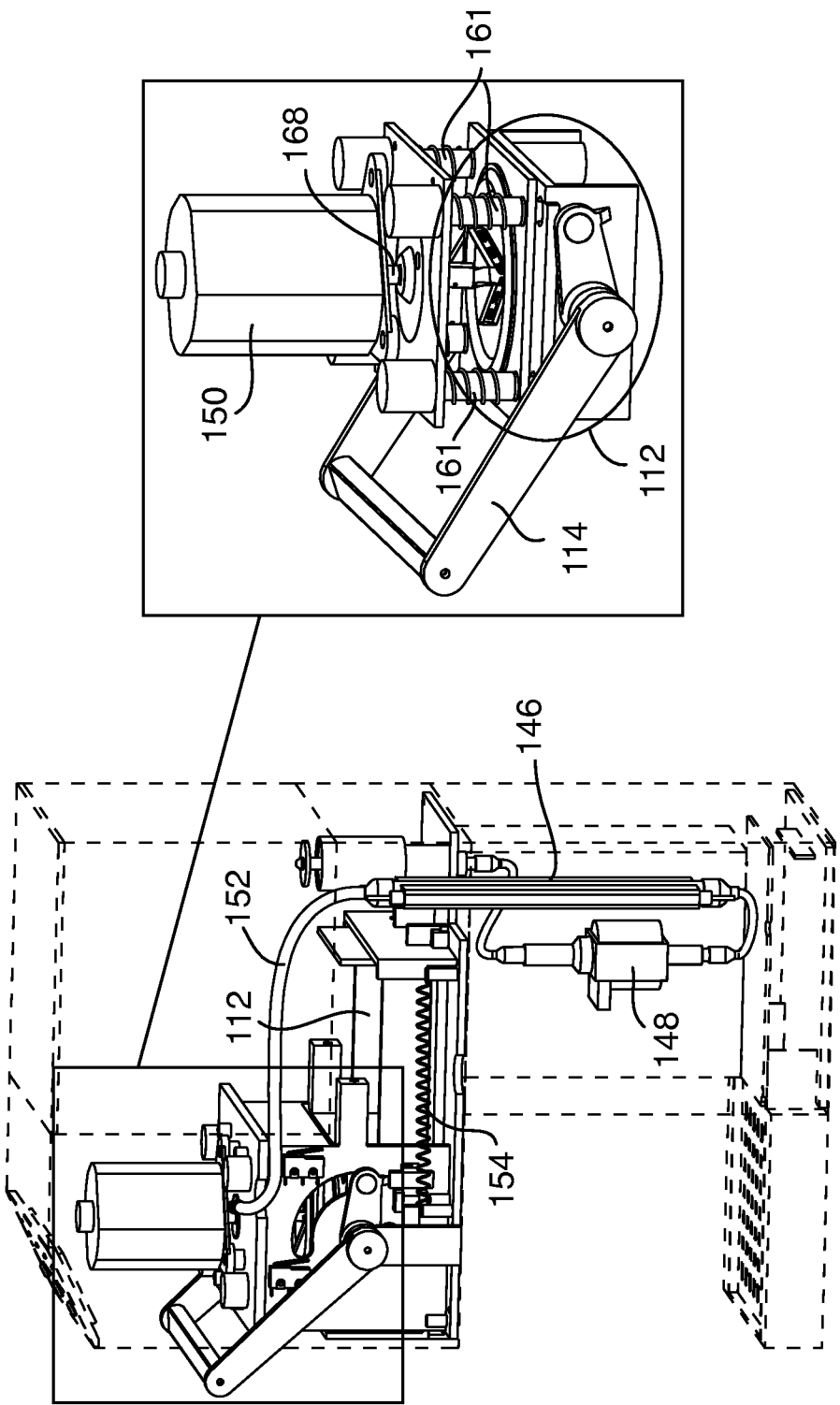
FIG. 30 is a detail schematic view of a grinding motor and grinding blade assembly of the coffee appliance of FIG. 9.
Figure 38:
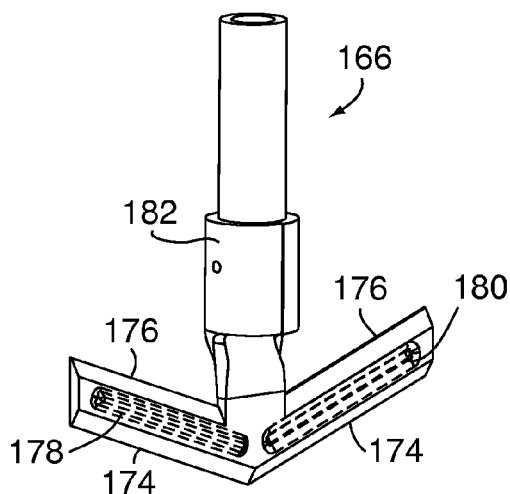
FIG. 38 is a perspective view of a grinding blade assembly for use with the coffee appliance of FIG. 9, in accordance with the present invention.
Figure 39:
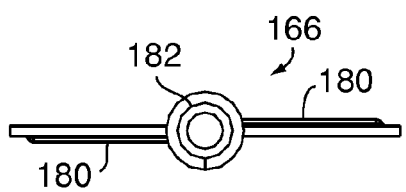
FIG. 39 is a top plan view of the grinding blade assembly of FIG. 38
Figure 40:
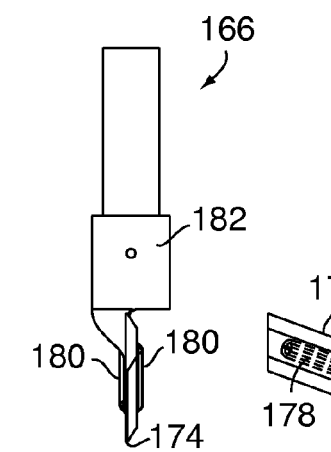
FIG. 40 is a left side elevational view of the grinding blade assembly of FIG. 38.
Figure 41:
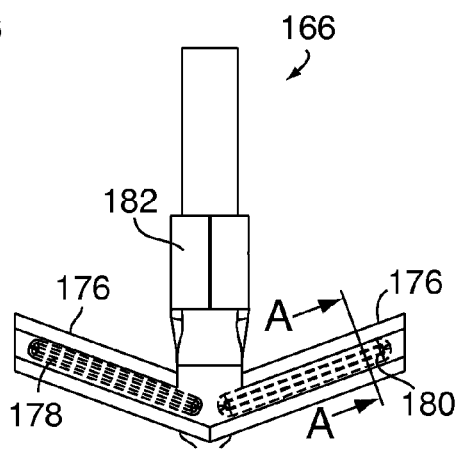
FIG. 41 is a front elevational view of the grinding blade assembly of FIG. 38.
Figure 42:
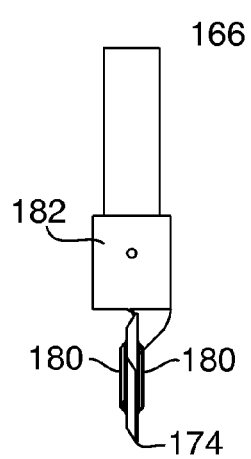
FIG. 42 is a right side elevational view of the grinding blade assembly of FIG. 38.
Figure 43:
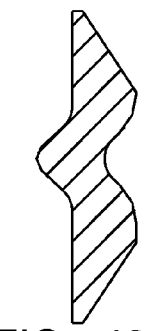
FIG. 43 is a side cross-sectional view of grinding blade assembly of FIG. 38, taken along line A-A of FIG. 41.

Referring to FIG. 30, the appliance 100 includes a grinding blade 166 attached to and driven by a rotary output shaft 168 associated with the grinder motor 150. When the handle 112 is moved to the lower position as shown in FIG. 28, the cup 10 is raised so that the blade 166 engages and pierces through the foil cover 18 and enters the cup 10 and comes into contact with the coffee beans 20. The cup loading/raising mechanism 156, which is activated by the handle 114, moves the cup 10 between this raised position for grinding, and a lowered position. The spring 154 is a user assist spring, which biases the tray 112 outwards from the housing 110 when then handle 114 is raised, in order to insert a cup 10.

As shown in FIG. 31, movement of the handle 114 to the raised position unlocks the tray 112 so it slides out under force of the spring 154 in cooperation with a plate 165 (which serves as a anchoring object for the spring to work off of) in order to allow placement of a cup 10 into the receiving bracket 124 of the tray 112. A user then places a cup 10 into the tray 112 as shown in FIG. 32. The tray 112 must be manually pushed back into the closed position as shown in FIG. 33 until it locks in place by the tray lock 170 shown in FIG. 34.

FIGS. 35-37 illustrate the piercing and grinding sequence in accordance with the present invention. As shown in FIG. 35, the filter cup 10 is raised upwardly toward the blade 166, in the direction of arrow F when the handle 114 is lowered. FIG. 36 illustrates the position of the cup 10 when it is fully raised. In that position, a seal ring 172, such as an O-ring, engages a top rim of the cup 10 so that when the brewing process occurs the cup 10 may be pressurized. FIG. 37 illustrates the lowered position of the cup 10 after grinding and brewing occur and the handle 114 is raised. Importantly, the seal ring 172 seals the top of the cup 10 so that the cup may be pressurized. In the preferred embodiment, the cup is pressurized in excess of 200 kilopascals (2 bars) during brewing, although other pressures may be employed without departing from the broader aspects of the present invention.

Various views of the grinding blade 166 for grinding the whole coffee beans are shown in FIGS. 38-43. As shown therein, the blade 166 has a V-shaped configuration. Importantly, the blade 166 has insert cutting edges 174 so that the foil cover 18 of the cup 10 can be pierced when the cup 10 is raised upon downwards movement of the handle 114. The top of the blade also includes upward facing extract cutting edges 176 for cutting through the foil cover 18 when the cup 10 is lowered away from the blade subsequent to brewing, upon upwards movement of the handle 114. Each leg of the "V" is also formed with an opposed recess 178 and raised ridge 180 to facilitate grinding of the coffee beans 20, as described hereinafter. The blade 166 also includes a collar 182 for connection to the output shaft 168 of the grinding motor 150. In such an embodiment, the blade 166 may be removable for replacement and/or more thorough cleaning. In an alternative embodiment, the blade 166 is integrally formed or otherwise fixedly secured to the output shaft 168 of the motor 150. As will be readily appreciated, the slim profile of the blade 166 puts cuts a slot a minimal width in the foil cover 18 to prevent coffee grounds 128 from being thrown out of the cup 10 during grinding. In addition, the shape and configuration of the blade 166 facilitates cleaning.

Figure 44:
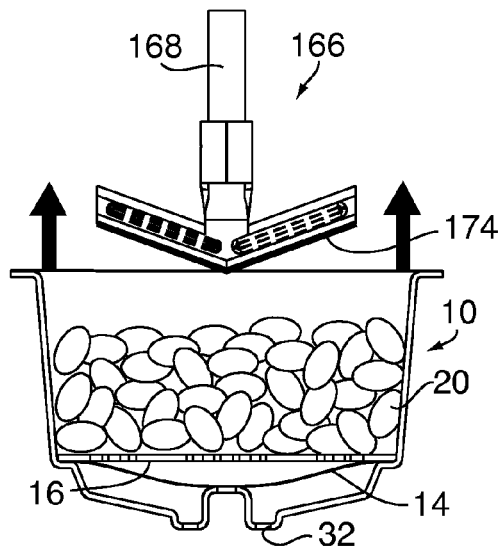
FIG. 44 is a schematic view of a blade assembly and the whole coffee bean pre-packaged filter cup of FIG. 1 shown in a first position.
Figure 45:
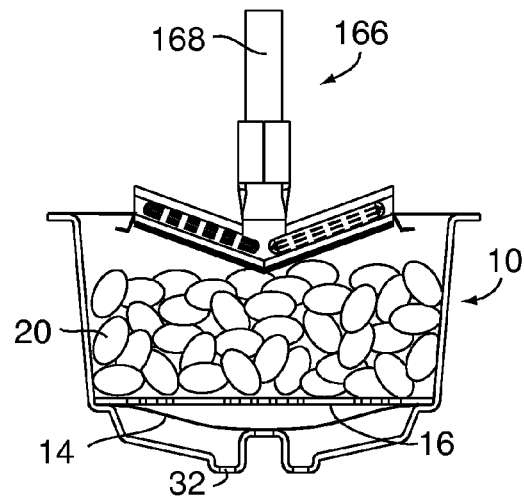
FIG. 45 is a schematic view of a blade assembly and the whole coffee bean pre-packaged filter cup of FIG. 1 shown in a second position.
Figure 46:
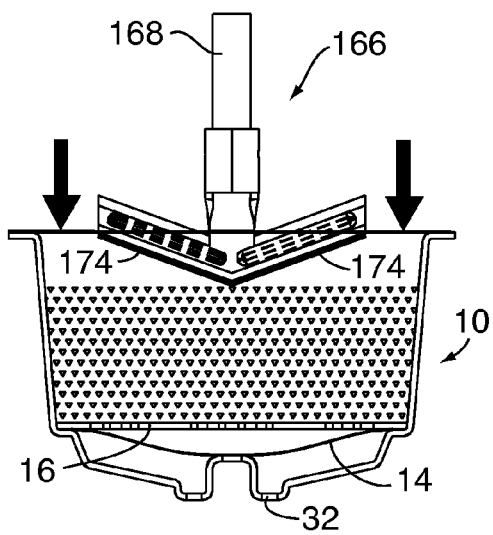
FIG. 46 is a schematic view of a blade assembly and the whole coffee bean pre-packaged filter cup of FIG. 1 shown in a third position.
Figure 47:
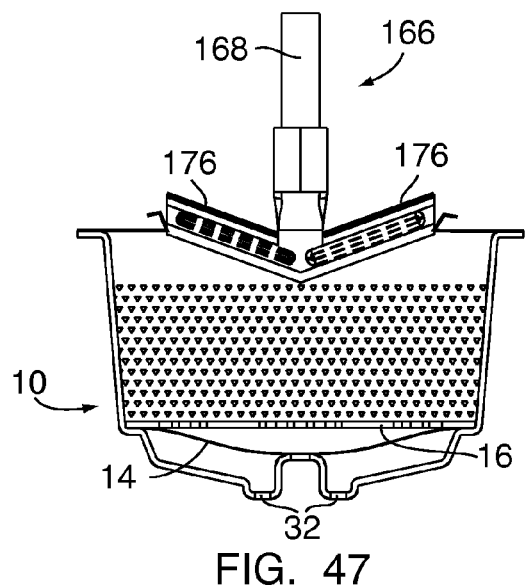
FIG. 47 is a schematic view of a blade assembly and the whole coffee bean pre-packaged filter cup of FIG. 1 shown in a fourth position.

FIG. 44 illustrates the cup 10 being raised toward the blade 166 and FIG. 45 illustrates the blade 166, by way of the insert cutting edges 174, piercing the foil cover 18 of the cup 10. In both FIGS. 44 and 45 the coffee beans 20 in the cup 10 are not yet ground. After grinding, the beans 20 have been transformed into ground coffee 128. Brewing occurs, as described above, and the cup 10 is then lowered as shown in FIGS. 46 and 47 such that the extract cutting edges 176 of the blade 166 again pierce the foil cover 18, if necessary, to facilitate removal of the cup 10 from the blade 166.

Figure 48:
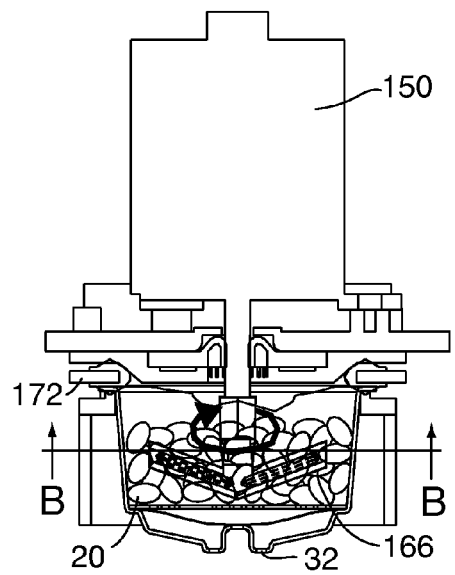
FIG. 48 is an enlarged schematic view of the coffee appliance of FIG. 1 in a grinding mode.
Figure 50:
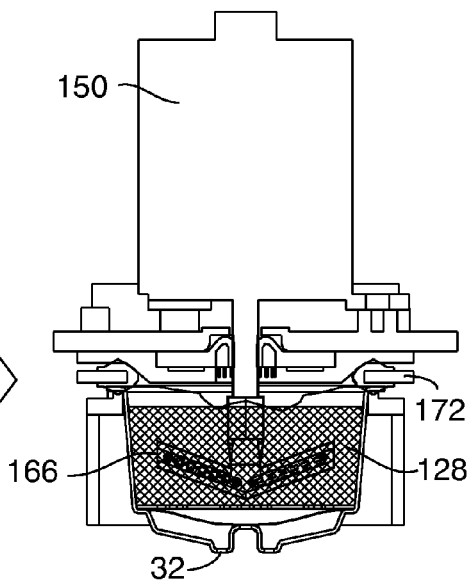
FIG. 50 is an enlarged schematic view of the coffee appliance of FIG. 1 subsequent to grinding coffee beans.
Figure 49:
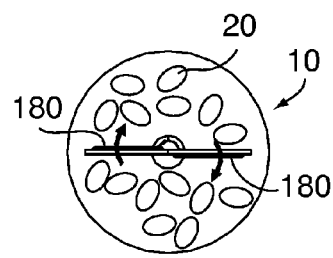
FIG. 49 is a cross-sectional view of the coffee appliance of FIG. 1 in a grinding mode, taken along line B-B of FIG. 48.
Figure 51:
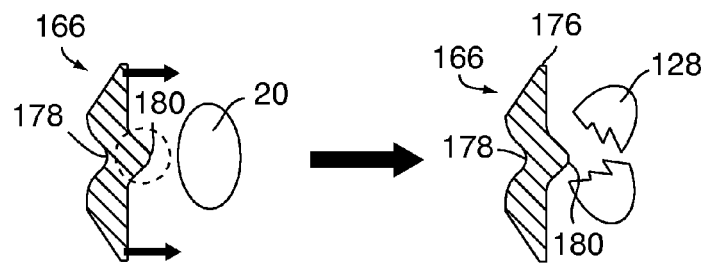
FIG. 51 is an enlarged schematic view of the grinding blade of the coffee appliance of FIG. 1 grinding a coffee bean according to the present invention.
Figure 52:
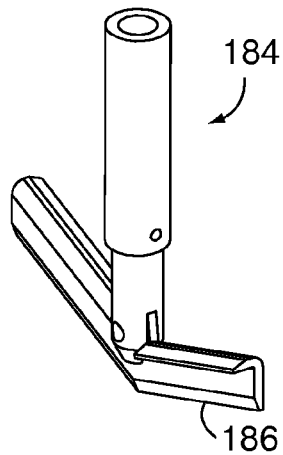
FIG. 52 is a perspective front view of an alternative grinding blade assembly for use with the coffee appliance of FIG. 9, in accordance with another embodiment present invention.
Figure 53:
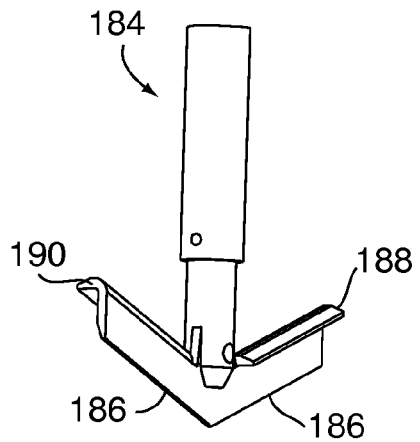
FIG. 53 is a perspective rear view of the alternative grinding blade assembly of FIG. 52.
Figure 54:
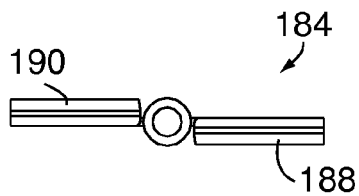
FIG. 54 is a top plan view of the alternative grinding blade assembly of FIG. 52.
Figure 55:
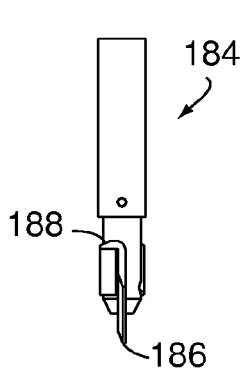
FIG. 55 is a left side elevational view of the alternative grinding blade assembly of FIG. 52.
Figure 56:
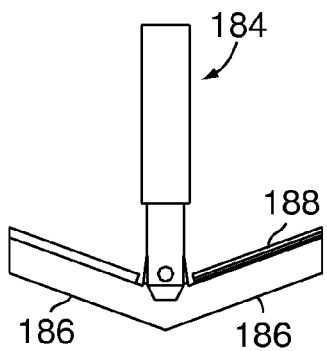
FIG. 56 is a front elevational view of the grinding blade assembly of FIG. 52.
Figure 57:
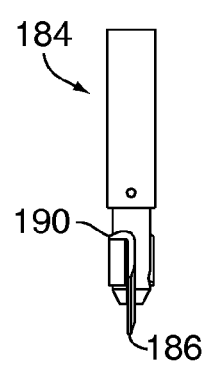
FIG. 57 is a right side elevational view of the grinding blade assembly of FIG. 52.
Figure 60:
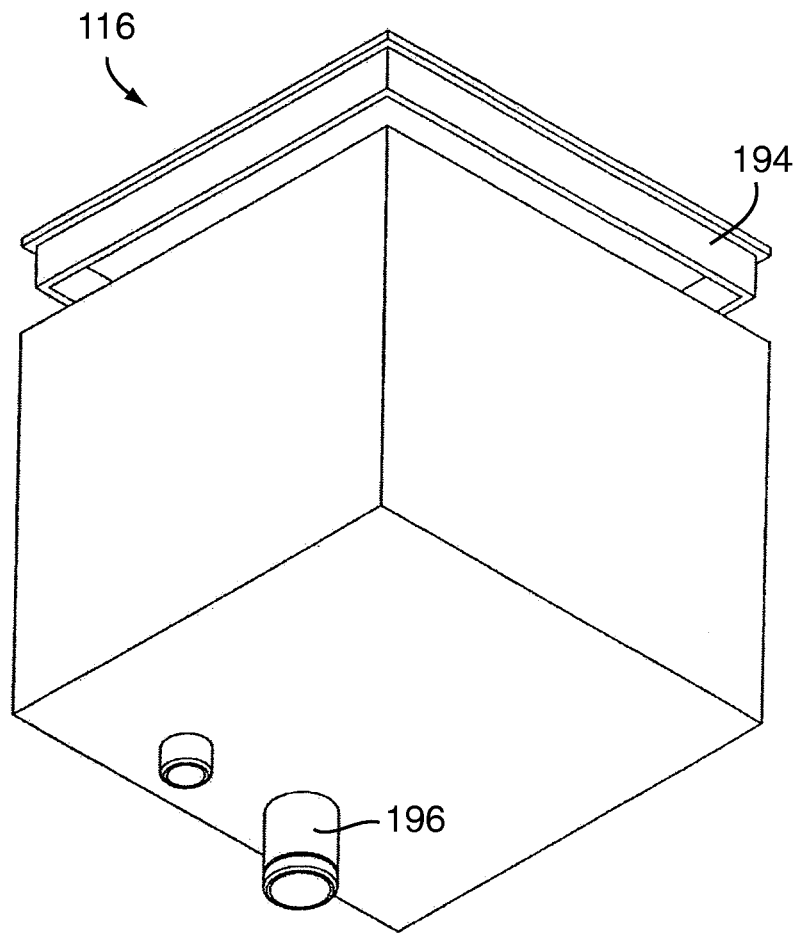
FIG. 60 is a perspective view of a water reservoir of the coffee appliance according to the present invention.
Figure 61:
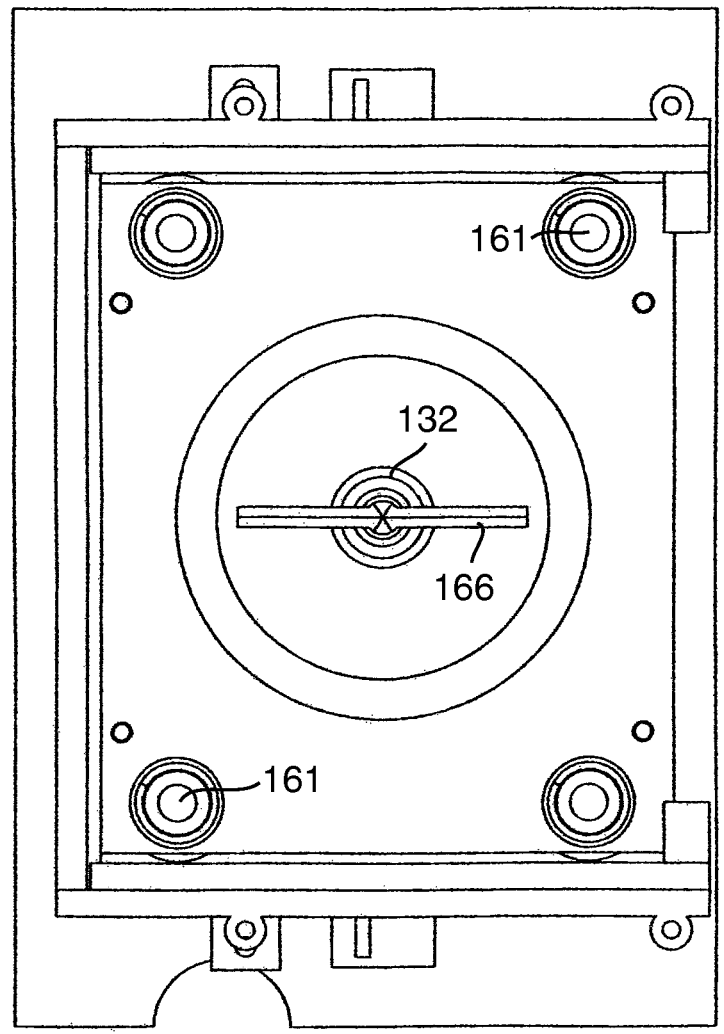
FIG. 61 is a bottom plan view of a portion of the coffee appliance of FIG. 9

Referring now to FIGS. 48-50, the actual grinding process is illustrated. Upon actuation of the grinding motor 150, the grinding blade 166 rotates at a high frequency sufficient to grind the coffee beans 20 in the filter cup 20 to transform the coffee beans 20 from whole beans, as shown in FIG. 48, to grinds, as shown in FIG. 60. In particular, the blade 166 is rotated in a direction (see FIG. 49) that causes the ridge 180 on the blade 166 to strike/impact the coffee beans 20 to cause them to split. Over time, numerous impacts from the blade itself, and most importantly, by the ridges 180, gradually reduce the size of the coffee beans to fine grounds sufficient for brewing. In an embodiment, the blade 166 may continue to rotate at a predetermined frequency during the brewing process, i.e., during the time during which hot water is passed through the cup 12. The frequency of rotation during brewing may be the same as, or different from, the frequency utilized to grind the coffee beans 20. In other embodiments, the blade 166 may be utilized to stir drink ingredients during brewing, such as to facilitate dissolution of drink ingredients into the water passing through the cup 10 (e.g., when utilizing iced tea drink ingredients in place of whole coffee beans). As will be readily appreciated, stirring the drink ingredients/coffee beans within the cup 10 while brewing may produce a better tasting beverage. In particular, stirring during brewing may improve the contact between the coffee grounds 128 and the hot water, which may improve coffee quality and/or concentration.

In an alternative embodiment, the filter cup 10 may be retracted from the grinding blade 166 prior to distributing heated water to the cup 10. As will be readily appreciated, this ensures that the grinding blade 166 only touches the coffee when it is dry (i.e., when it grinds the coffee beans 20 prior to brewing). Accordingly, grounds coffee is not as susceptible to sticking to the blade 166 as it would be if the blade 166 and ground coffee 128 were present together in a wet environment and, as such, keeps the blade substantially free of coffee grounds without having to clean the blade.

FIGS. 52-57 illustrate an alternative configuration for a grinding blade 184 that may be utilized with the appliance 100. As shown therein, the blade has a V-shaped configuration and has a piercing edge 186 for piercing the foil cover 18 of the cup 10. The blade 184 also has two horizontally extending flanges 188, 190 to facilitate grinding of the coffee beans 20 and two upward edges 192, 194 for again cutting through the foil 18 when the cup 10 is lowered away from the blade 184. As with the blade 166 of the preferred embodiment, the blade 184 may be releasably attached to the output shaft 168 of the grinding motor 150, or it may be integrally formed or otherwise permanently affixed thereto.

Figure 58:
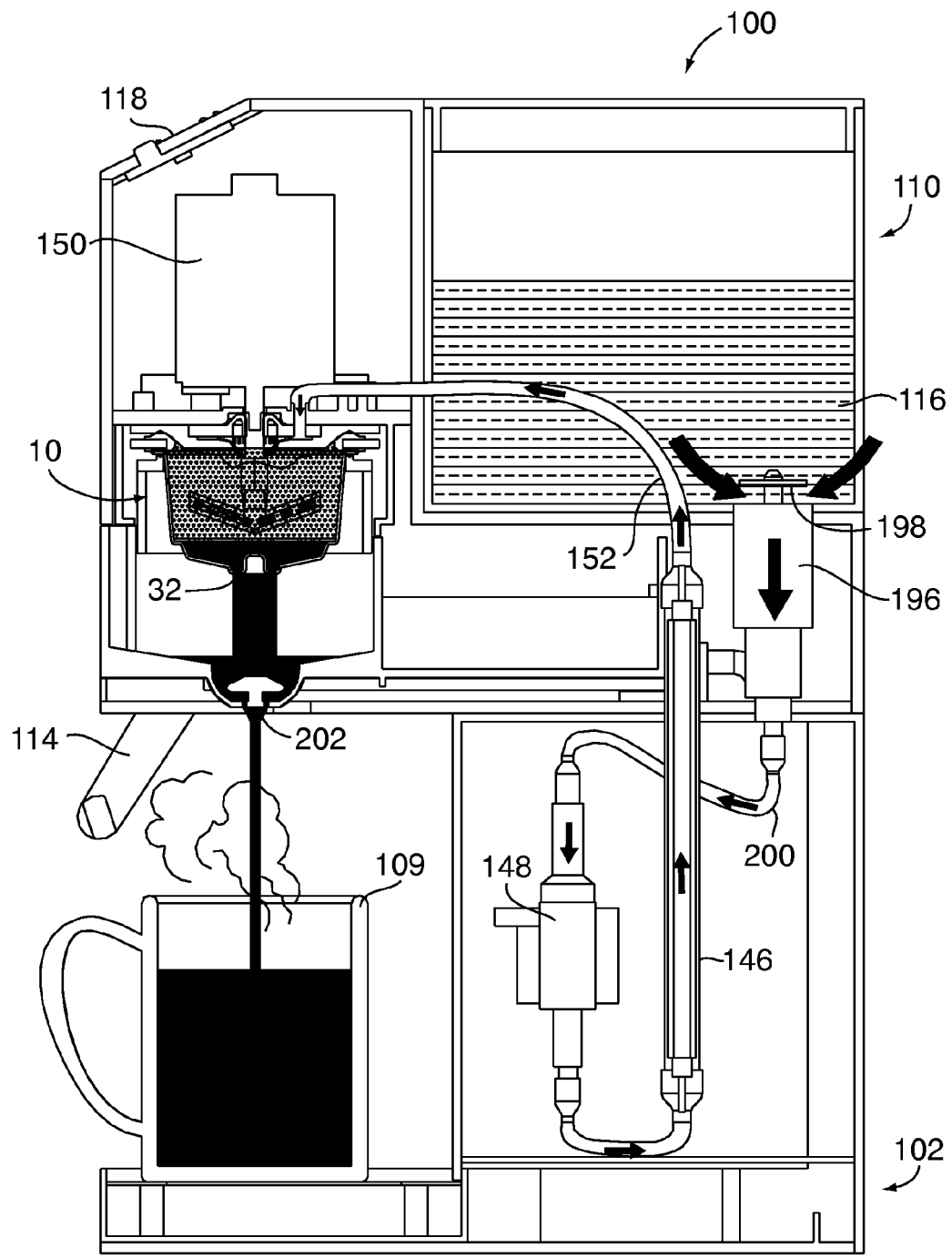
FIG. 58 is a schematic, cross-sectional view of the coffee appliance of FIG. 9 illustrating a flow of water from a reservoir through the pre-packaged filter cup of FIG. 1.

The path of water used in the process of the present invention is illustrated in FIG. 58. First, the reservoir 116 is filled with water. In an embodiment, the reservoir 116 may be releasably received on the housing 110 such that a user can remove the reservoir 116 to fill it with water and then place it on the housing 110. As will be readily appreciated, such a configuration may be easier than bring a water source to the reservoir itself. The reservoir 116 may have a removable lid 194 as shown in FIG. 60 to facilitate filling with water. A water outlet 196, best shown in FIGS. 17-24, permits water to flow from the reservoir 116 under the force of gravity. The outlet 196 may be equipped with a valve 198 of a type commonly known to those skilled in the art, wherein the valve my be electronically activated and controlled by means of a conventional controller from an open position to a closed position, and vice versa. During brewing, water exits the reservoir 116 through the outlet 196 and travels through a first tube 200 until it reaches the pump 148. The pump 148 pumps the water through the heater 146 in order to heat the water to a desired, predetermined temperature. The water passes from the heater 146 through the hot water supply tube 152 to the water outlet 132.

In an embodiment, at the end of the brewing process, the flow of water will be shut off prior than the heater such that steam will be generated to push or blow out excess liquid remaining in the cup 10. As will be readily appreciated, this steam blast ensures that the last few drops of coffee do not remain in the cup 10 and prevents dripping.

Figure 25B:
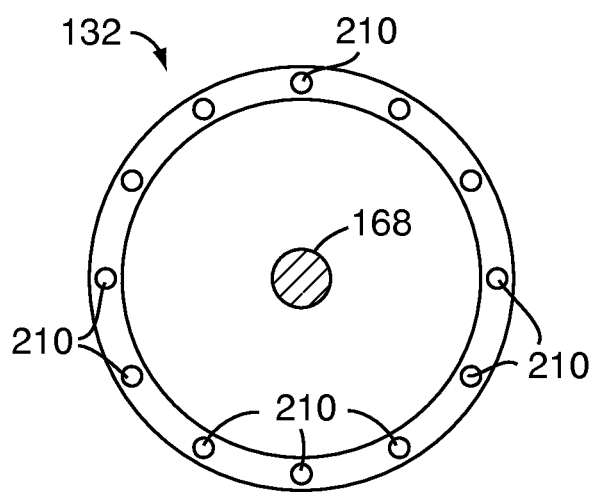
FIG. 25B is a bottom plan view of a shower head for distributing heated water to the whole coffee bean pre-packaged filter cup of FIG. 1 in accordance with the present invention.

As shown in FIG. 25B, in an embodiment, the water outlet 132 is a shower head in the form of an annular tube or ring 208 having a plurality of apertures 210 formed therein for distributing heated water. Heated water emitted from the apertures 210 of the shower head 132 is used both for brewing coffee and for rinsing the blade 166 in the cleaning operation. During brewing the heated water leaving the water outlet/shower head 132 enters the cup 10 which, at this point in the process, contains ground coffee 128. The water, now brewed coffee, exits the cup 10 through the apertures 32 in the floor 26 of the cup 10. As it exits the cup through the apertures 32, it travels down through an exit conduit in the tray 112 before emitting through the tray exit 202. In an embodiment, the tray may include a flow softening member 204 directly below the apertures 32 of the filter cup 10. The flow softening member retards the direct flow of brewed coffee into the coffee mug 109 so that the brewed coffee doesn't gush out and splash a user or create a mess. After leaving the exit 202, the water, which has now become brewed coffee, falls into the coffee mug 109. The volume of liquid selected, corresponding to the serving size, is pre-selected using the controls 118, and the pump 148 and water outlet 196 are accordingly controlled to permit flow of only the selected amount before shutting off flow.

FIGS. 65-67 illustrate an alternative configuration of the drip tray 106 in accordance with another embodiment of the present invention. As shown therein, the drip tray is moveable between a first position, as shown in FIG. 66, in which the tray 106 is positioned below the brewed coffee exit 202, and a second position, as shown in FIG. 7, in which the drip tray 106 is housed within the base 102 of the appliance 100. With the drip tray 106 in the position shown in FIG. 67, taller cups/mugs 206 may be accommodated.

Figure 68:
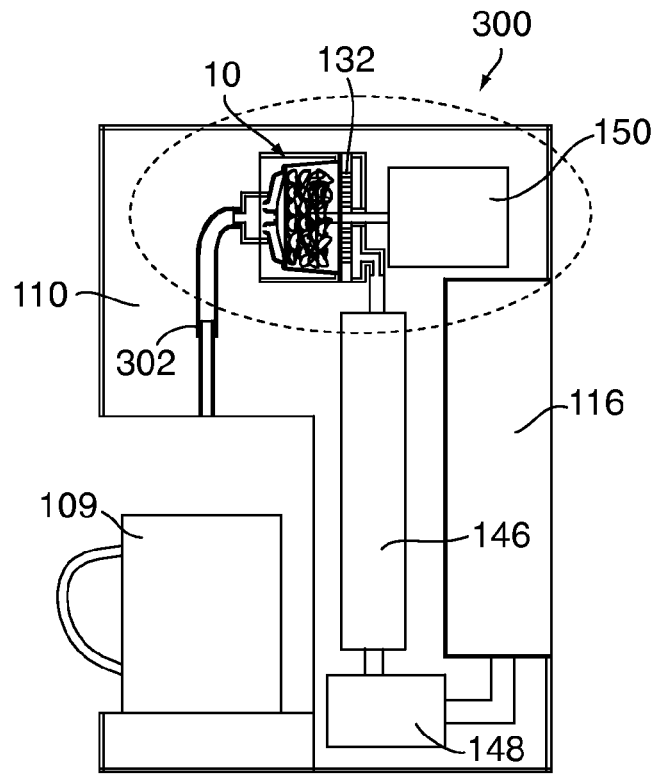
FIG. 68 is a schematic view of a coffee appliance according to another embodiment of the present invention.

FIG. 68 illustrates a coffee appliance 300 having an alternative configuration in accordance with one embodiment of the present invention. As shown therein, instead of the cup 10 being installed vertically and the grinding blade 166, brew shower head 132 and motor 150 being in a vertical position above the cup 10, these elements are oriented horizontally. In particular, as shown therein, the filter cup 10 is installed in a horizontal orientation within the housing 110. In addition, the grinding motor 150, shower head 132 and blade 166 are positioned to the side of the cup 10 in a horizontal position. In this embodiment, the appliance 300 includes a conduit 302 in communication with the bottom of the cup 10 such that brewed coffee exits the cup and is routed through the conduit 302 to the outlet 202 for distribution into a user's cup 109.

Figures 69, 70:
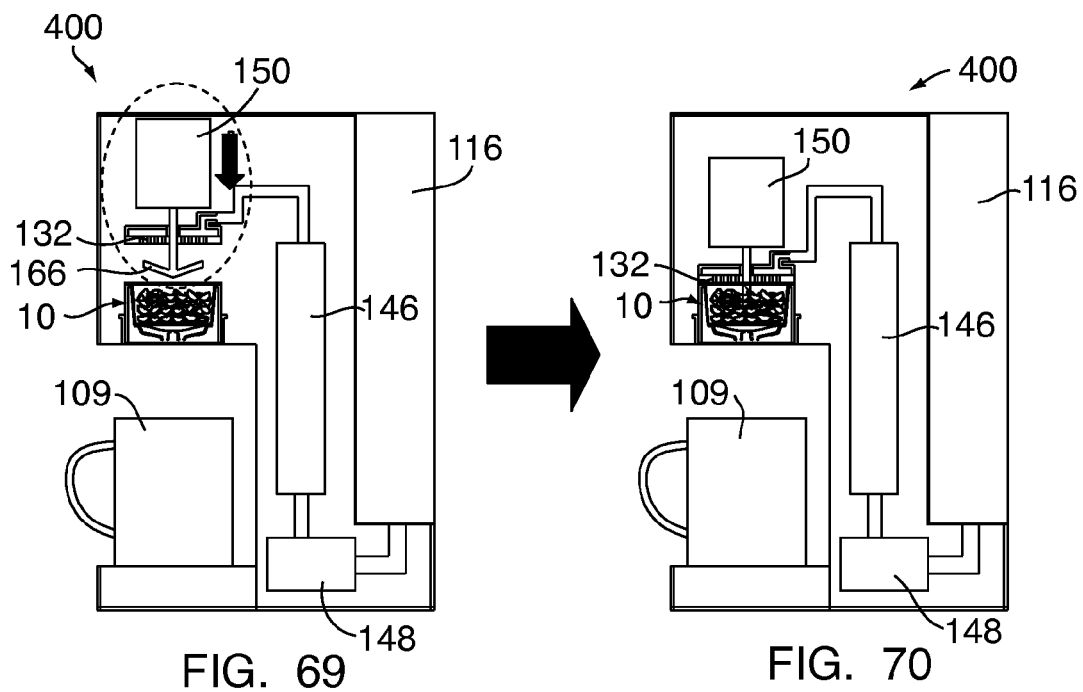
FIG. 69 is a schematic view of a coffee appliance in accordance with another embodiment of the present invention, illustrating a grinding motor in a first position.
FIG. 70 is a schematic view of the coffee appliance of FIG. 69 illustrating the grinding motor in a second position.

FIGS. 69 and 70 illustrate a coffee appliance 400 according to yet another embodiment of the present invention. The coffee appliance 400 is similar in configuration to that of the appliance 100 disclosed above, with a few notable differences. As shown therein, instead of the motor 150, blade 166 and shower head 132 being stationary and the cup 10 being lifted into engagement with the blade 166, in this embodiment, the brew shower head 132, motor 150 and blade 166 are configured to move towards and away from a stationary cup 10. FIG. 69 illustrates a first position of the motor 150, blade 166 and brew head 132 above the stationary filter cup 10. The motor 150, blade 166 and brew head 132 are moveable in the vertical direction to a second position, shown in FIG. 70, in which the blade is disposed within the cup 10. The vertical movement of the motor 150, blade 166 and shower head 132 may be effectuated by utilizing mechanical action or electrical actuators. The coffee appliance 400 according to this embodiment may be characterized as having an active brew assembly (motor 150, grinding blade 166 and shower head 132) and a passive filter cup 10, as opposed to an active filter cup 10 and passive brew assembly.

While the preferred embodiment contemplates the grinding and brewing of coffee from whole coffee beans, the present invention is not intended to be limited in this regard. In particular, it is contemplated that the present invention apparatus and method are not limited to cups containing whole bean coffee, per se, and the invention may be used with cups containing ground coffee, partially ground coffee, tea leaves, ground tea, or drink mix ingredients. In addition, the appliance according to the embodiments of the present invention can make/brew beverages from any ingredients contained within the filter cup, and is not limited to brewing coffee from whole coffee beans.

FIGS. 71-82 illustrate a coffee appliance 500 in accordance with yet another embodiment of the present invention. The coffee appliance 500 is generally similar to, and contains many of the same components as, the coffee appliance 100, disclosed above, with a few notable differences. As with the coffee appliance 100, the coffee appliance 500 is intended to be used in combination with the filter cup 10, disclosed above, in order to brew a coffee or other beverage. Preferably, the filter cup 10 contains whole coffee beans.

Figure 71:
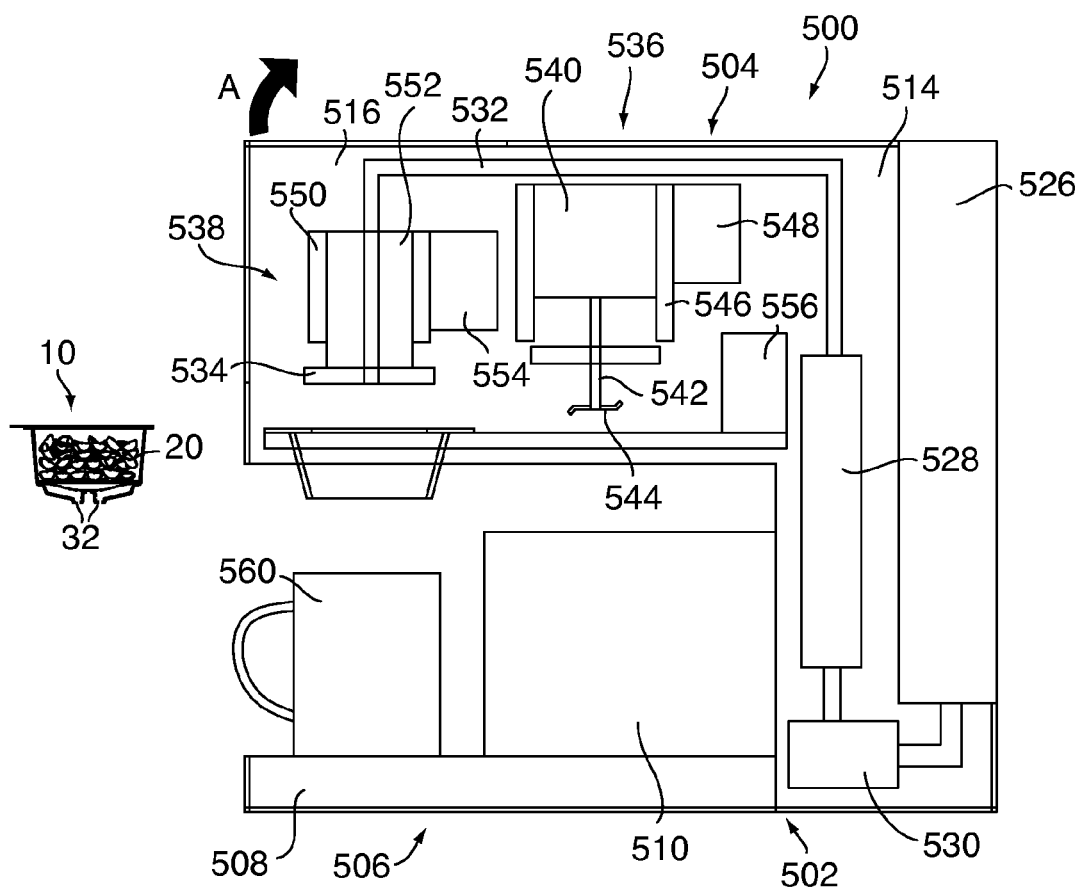
FIG. 71 is a schematic view of a coffee appliance in accordance with another embodiment and in a first mode of operation.

As shown in FIG. 71, the coffee appliance 500 includes a base 502 and a housing 504 connected to and supported by the base 502. The base 502 defines a drip tray housing 506 slidably receiving a drip tray 508. As with the drip tray 106, described above, the drip tray 508 may have a slotted or grated top surface to permit liquid that may be spilled during operation to pass therethrough and collect in the drip tray 508, for easy cleanup. As shown therein, a discard bin 510 is releasably attached to the base 502 for receiving used filter cups, as discussed hereinafter.

Figure 72:
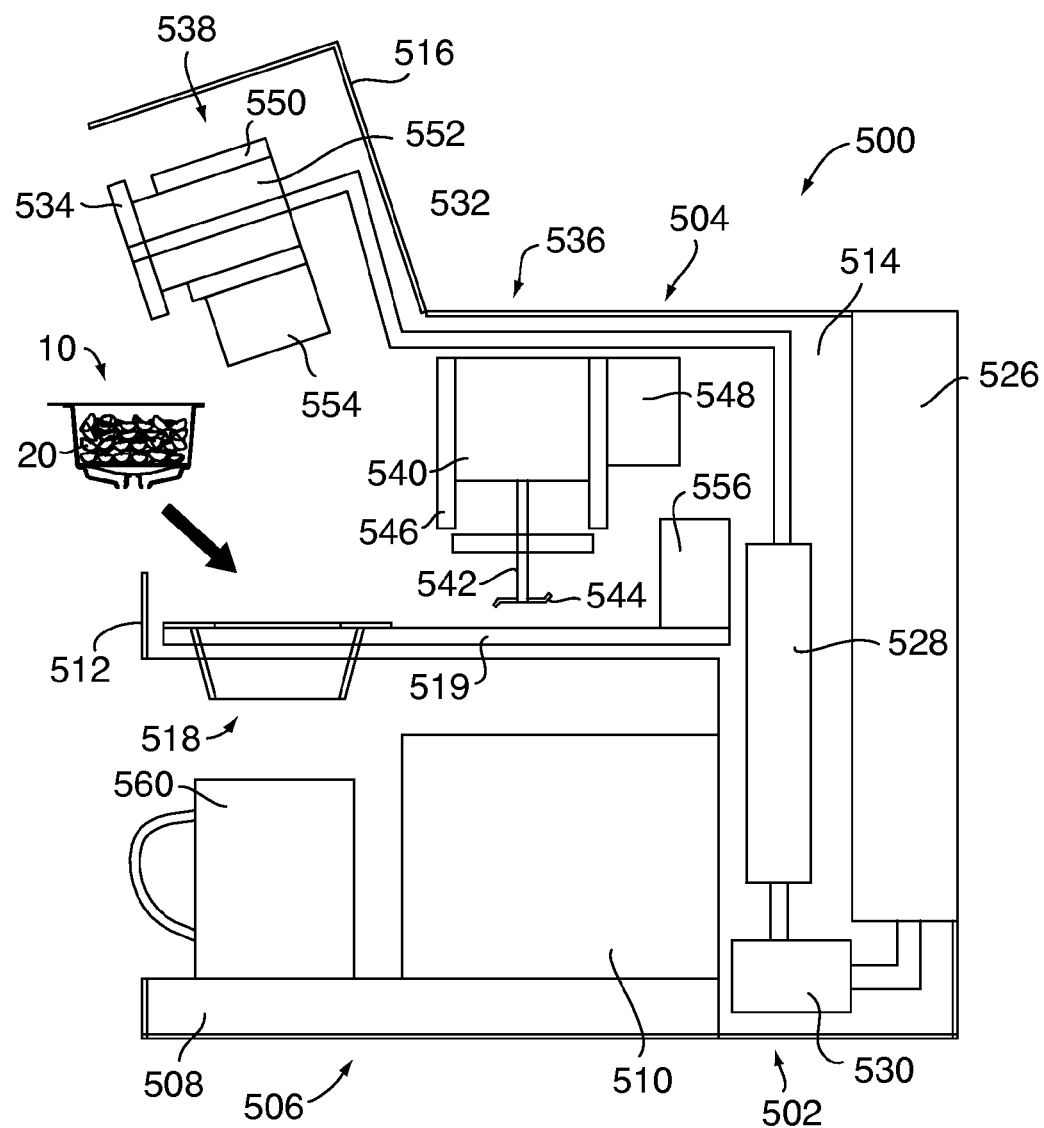
FIG. 72 is a schematic view of the coffee appliance of FIG. 71, in a second mode of operation.

As best shown in FIGS. 71 and 72, the housing 504 includes a bottom portion 512, a top portion 514 and a forward portion 516 hingedly connected to the top portion 514. The forward portion 16 is pivotable, in the direction of arrow A, between a closed position, as shown in FIG. 71, in which the forward portion 516 is in engagement with the bottom portion 512, and an open position, as shown in FIG. 72, in which the interior of the housing 504 may be accessed to insert or remove a filter cup 10, as discussed below. In the closed position, the top surface of the forward portion 516 and the top surface of the top portion 514 of the housing 504 form a generally planar upper surface of the appliance 500.

Figure 83:
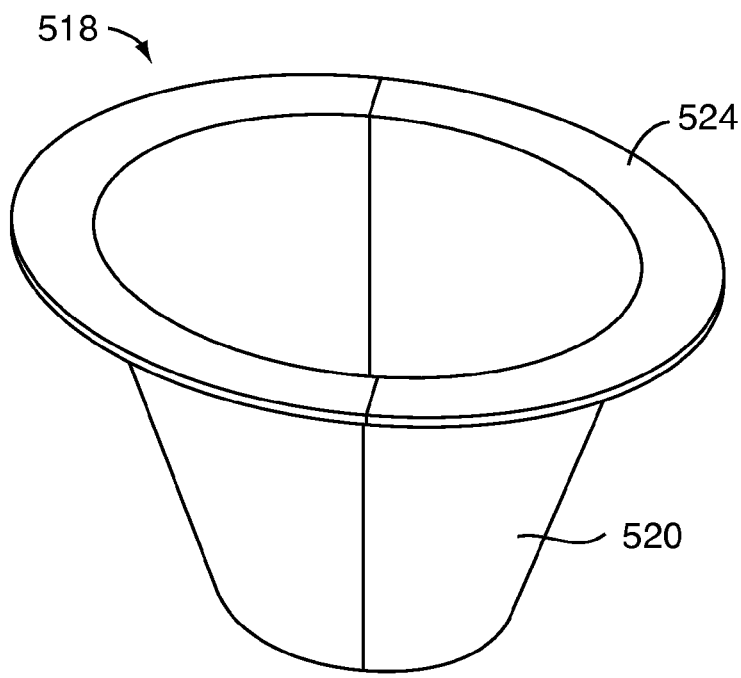
FIG. 83 is a perspective view of a brewing carriage of the coffee appliance of FIG. 71.
Figure 84:
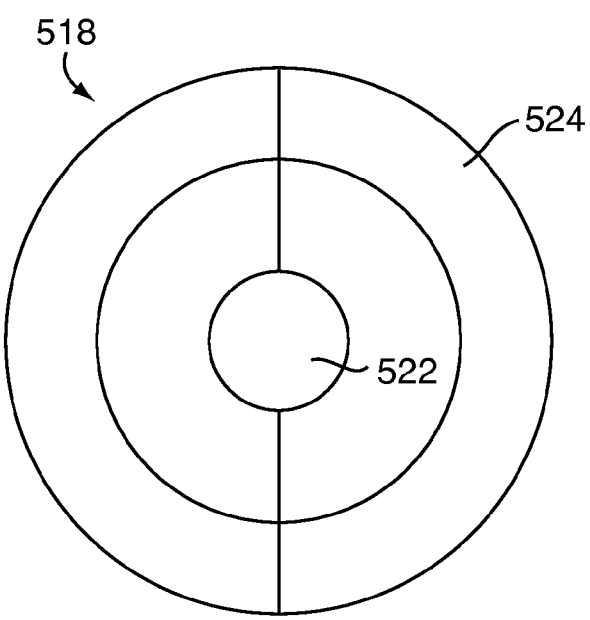
FIG. 84 is a top plan view of the brewing cartridge of FIG. 83

As further shown in FIG. 72, the bottom portion 512 of the housing 504 supports a brewing carrier 518 on a linearly moveable track 519. As shown in FIGS. 83 and 84, the brewing carrier 518 generally takes the form of a conical cup 520 sized and shaped to closely receive a filter cup 10 therein. In particular, the carrier 518 is open at a top thereof to permit insertion of the filter cup 10, and has an aperture 522 at a bottom thereof for permitting brewed coffee or other brewed beverage to exit the appliance 500 through the carrier 518. A flange 524 extends outwards from the sidewalls of the cup and may have one or more sprockets or protrusions (not shown) extending from a bottom thereof for engaging the linearly moveable track 519. The brewing carrier is separable in half to permit automatic removal of the filter cup 10 after use, as discussed below.

In an embodiment, the linearly moveable track 519 may be a chain. In operation, the sprocket/protrusion on the underside of the flange 524 of the brewing carrier 518 may engage with one of the links of the chain such that linear movement of the chain causes linear movement of the brewing carrier 518 between a grinding position and a brewing position, as discussed hereinafter. Alternatively, the linearly movable track may be a band, such as plastic or rubber, having a plurality of teeth for engaging at least one complimentary shaped recess in the brewing carrier 518 to effect linear movement thereof. In other embodiments, other means for linearly moving the brewing carrier between a brewing position and a grinding position may also be utilized without departing from the broader aspects of the present invention.

With further reference to FIG. 71, the coffee appliance 500 also includes a water reservoir 526 that is attached to, supported by, and/or otherwise forms a part of the housing 504. In an embodiment, the water reservoir 526 may be removable from the housing 504 to facilitate water filling. The appliance 500 further includes a boiler 528 having a heater for heating water from the reservoir 526 passing therethrough, and a pump 530 for pumping water from the reservoir 526, through the boiler 528, through a hot water supply conduit 532, and to a hot water outlet. In an embodiment, the pump 530 is a solenoid pump. The water outlet is preferably in the form of a shower head 534 and is disposed above the filter cup 10 in a brewing position, as described in detail below. The boiler/heater 528 and pump 530 may be of the type commonly utilized in the art. As with the shower head 132 of the coffee appliance 100, the shower head 534 is preferably annular in shape and has a plurality of apertures on an underside thereof for distributing heated water to the filter cup 10 in the brewing position within the housing 504. As will be readily appreciated, the water flow path and components for delivering heated water to the filter cup 10 are substantially similar to the flow path and components of the coffee appliance 100.

Figure 73:
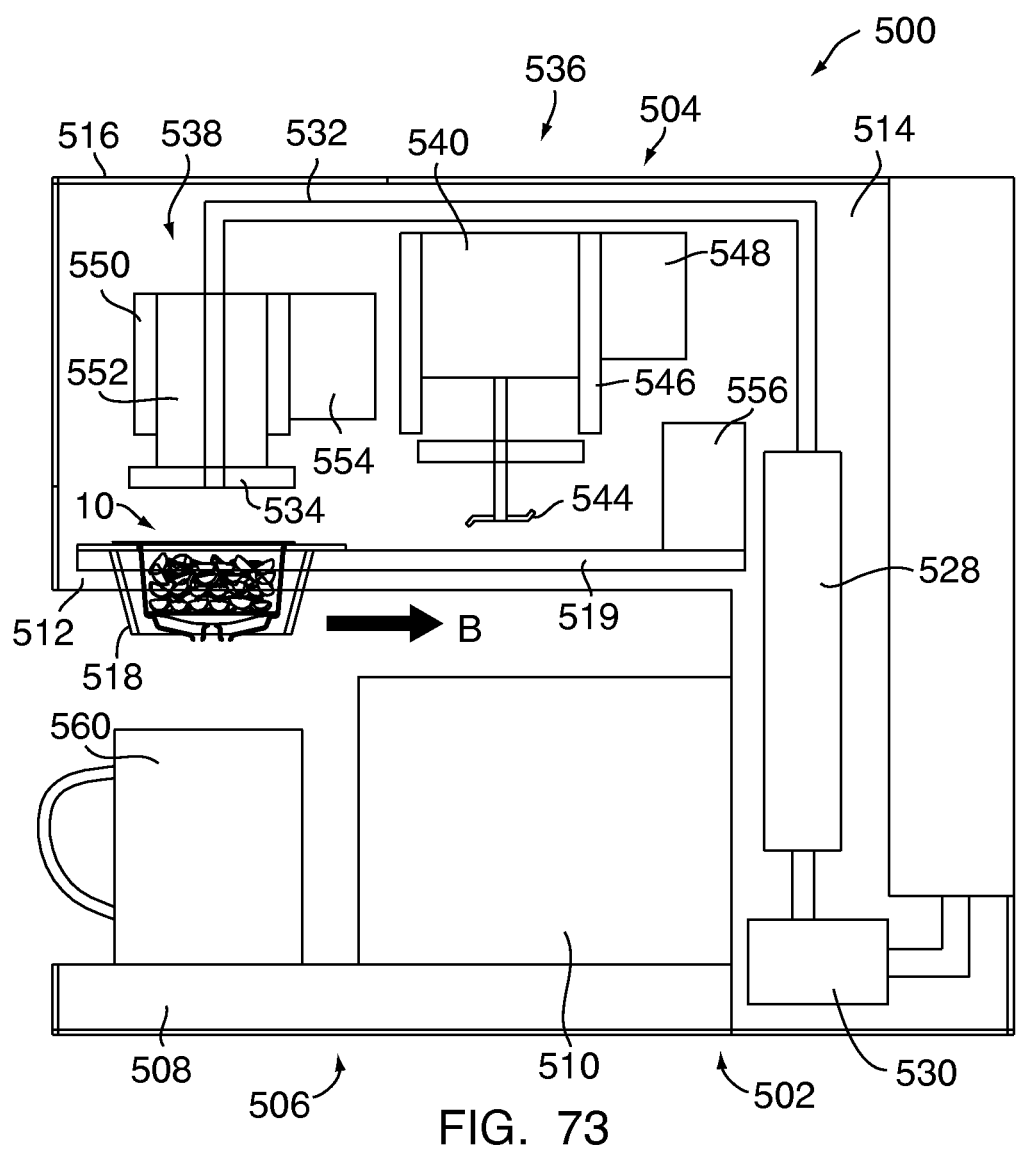
FIG. 73 is a schematic view of the coffee appliance of FIG. 71, in a third mode of operation.
Figure 74:
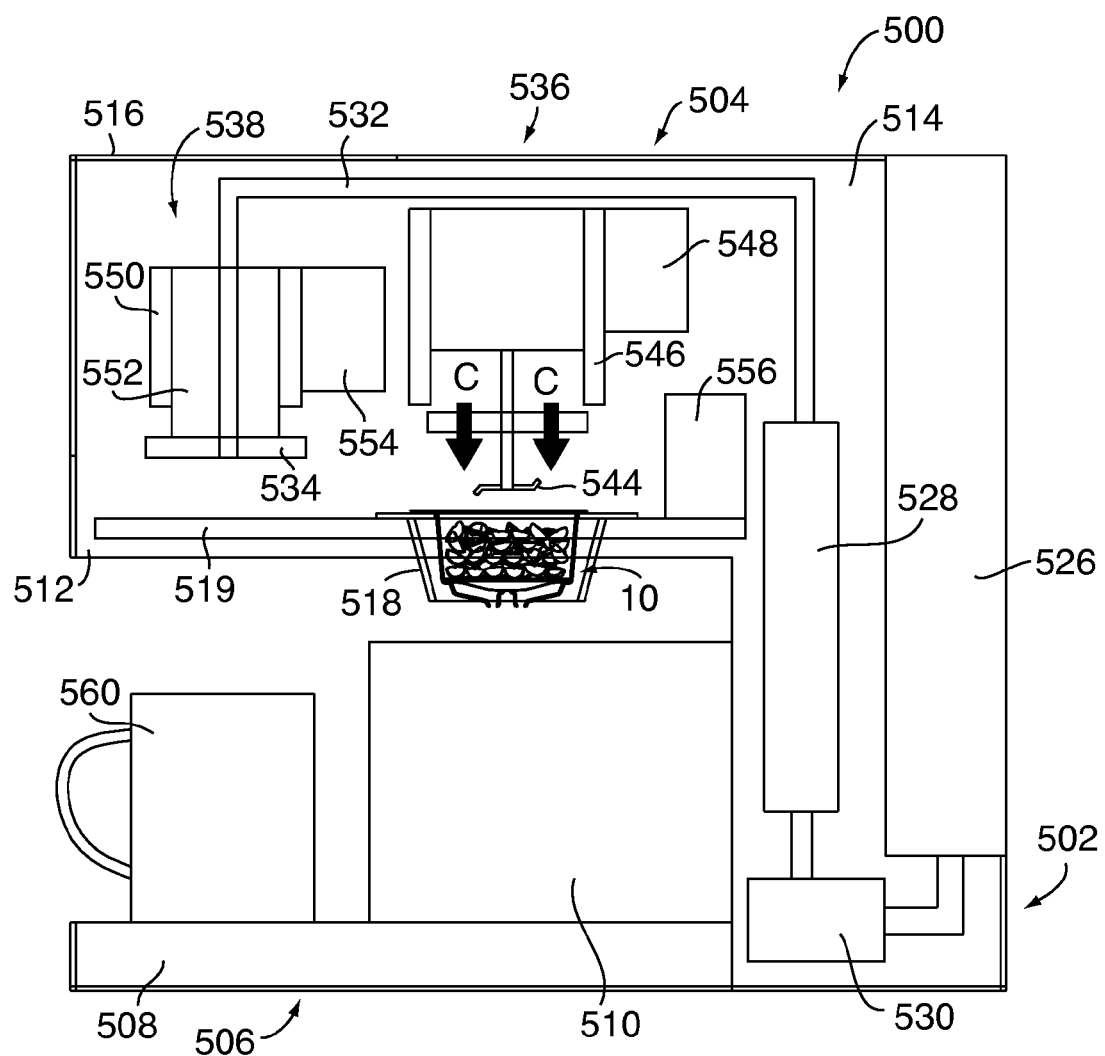
FIG. 74 is a schematic view of the coffee appliance of FIG. 71, in a fourth mode of operation.
Figure 75:
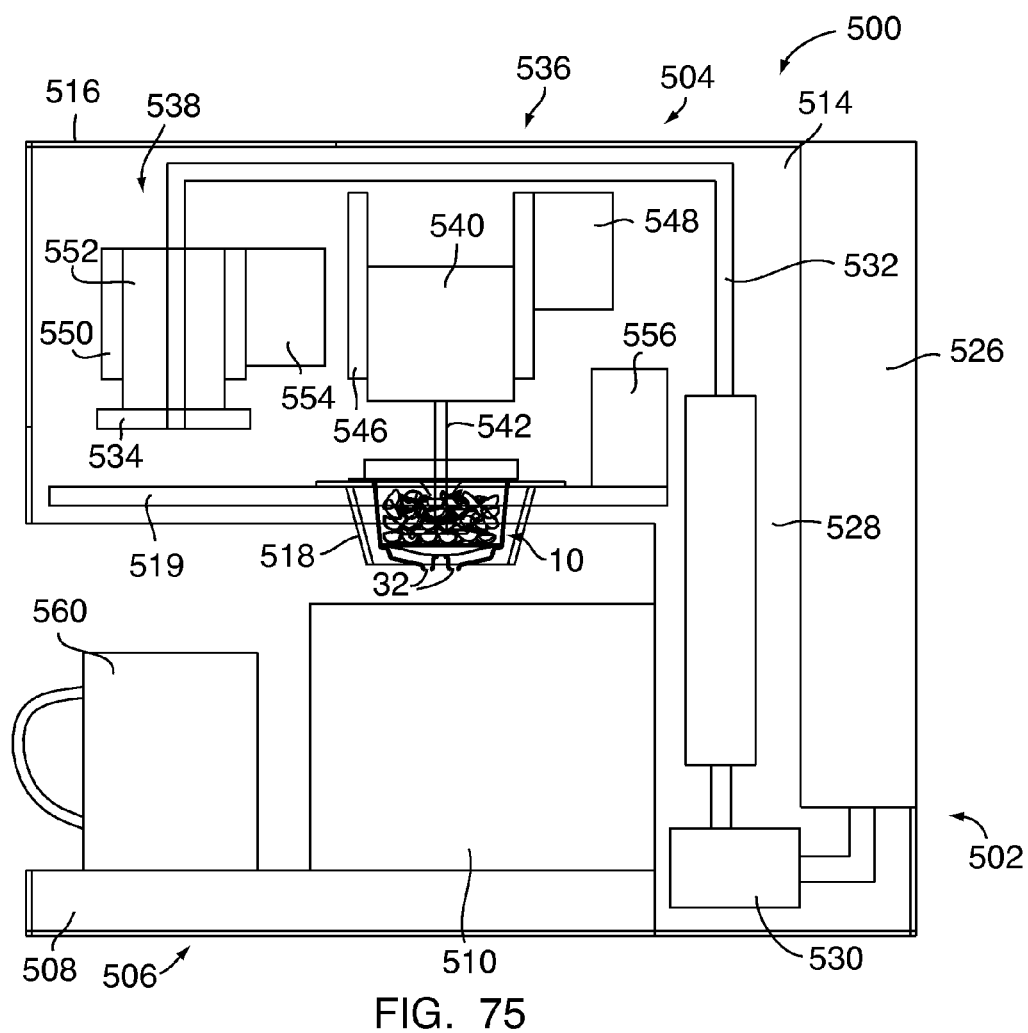
FIG. 75 is a schematic view of the coffee appliance of FIG. 71, in a fifth mode of operation.

As shown in FIGS. 71-82, and as alluded to above, the appliance 500 further includes a grinding station 536 and a brewing station 538. The grinding station 538 includes a grinding motor 540 for rotatably driving an output shaft 542 connected thereto, and a grinding blade 544 operatively connected to the output shaft 542. The grinding blade 544 and motor 540 may be housed within a cylindrical sleeve 546 and the motor 540, shaft 542 and blade 544 are vertically movable between a first position, in which the blade 544 is adjacent to or housed within the sleeve 546, as shown in FIG. 71, and a second position in which the blade 544 is extended from the sleeve 546, as shown in FIG. 75. The grinding station 536 further includes a motor 548 for moving the grinding motor 540 and blade 544 between the first position and the second position.

Figure 79:
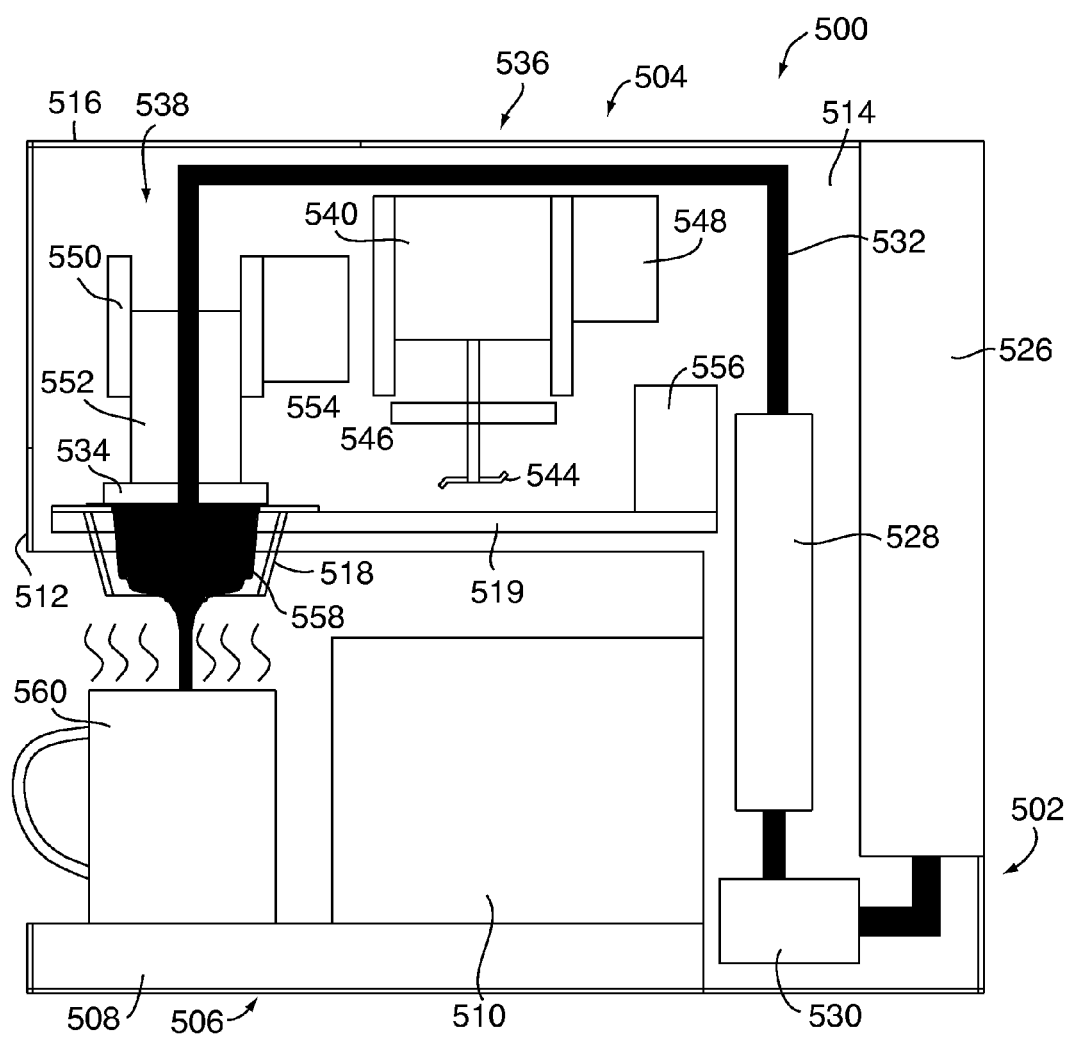
FIG. 79 is a schematic view of the coffee appliance of FIG. 71, in a ninth mode of operation.

As shown therein, the brewing station 538 includes a cylindrical sleeve 550 and a piston 552 slidably received in the cylindrical sleeve 550. The piston 552 is fixedly secured to the shower head 534 and has a passageway through which the hot water supply line 532 is routed. Importantly, the piston 552 and shower head 534 are movable vertically within the cylindrical sleeve 550. In particular, the brewing station 538 also includes a motor 554 for moving the piston 552 and shower head 534 between a first position, in which the shower head 534 is positioned adjacent the cylindrical sleeve 550, as shown in FIG. 71, and a second position in which the shower head 534 is extended away from the cylindrical sleeve 550, as shown in FIG. 79. The brewing station 538 may be secured to the forward portion 516 of the housing 504 and is moveable therewith between the open and closed positions.

Importantly, the appliance 500 includes a track motor 556 connected to the track 519. The motor 556 is actuatable to effect movement of the track 519 to thereby move the brewing carriage 518 from a position directly beneath the shower head 534 of the brewing station 538 to a position directly beneath the grinding blade 544 of the grinding station 536.

The boiler 528, pump 530, grinding motor 540, brewing station motor 554 and track motor 556 are each electrically connected to a controller (not shown) for controlling operation thereof. A control panel (not shown) on the housing 504 is electrically connected to the controller and provides an interface for a user to control operation of the appliance 500, such as the number of cups to be brewed, automatic brewing and timer features, etc.

Operation of the coffee appliance 500 will now be described with reference to FIGS. 71-82. As shown in FIG. 71-73, first, a user selects a pre-packaged filter cup 10 containing a plurality of whole coffee beans 20. A user then lifts up the forward portion 516 of the housing 504 in the direction of arrow A to the position shown in FIG. 72 to obtain access to the brewing carriage 518. The user then inserts the filter cup 10 into the carriage 519, as shown in FIG. 72. The user then closes the forward portion 516 of the housing 504 such that it engages with the bottom portion 512. In an embodiment, a sensor will may either sense that the forward portion 516 is closed and/or that a filter cup 10 is properly positioned in the brewing carriage 518. Upon detection of the filter cup 10 received in the brewing carriage 518 and/or the forward portion 516 being in a closed position, the controller will actuate the track motor 556. In another embodiment, a user may depress a START button on the control panel to manually start the brewing process, which starts with actuation of the track motor 556.

As shown in FIG. 73, the track motor 556 will effect movement of the track 519 such that the track 519 engages the brewing carriage 518 and moves the carriage in the direction of arrow B to the grinding position shown in FIG. 74, directly beneath the grinding blade 544. Once in the grinding position, the grinding station motor 548 will actuate, causing the grinding motor 540 and grinding blade 544 to move downwards towards the filter cup 10 in the direction of arrow C such that the blade 544 pierces the foil cover 18 of the filter cup 10 and enters the cup 10. Once the blade 544 is positioned within the cup, the motor 540 is actuated, causing the blade 544 to rotate at a predetermined frequency, thereby grinding the whole coffee beans 20 or otherwise mixing the drink ingredients within the cup 10, as shown in FIG. 75.

Figure 76:
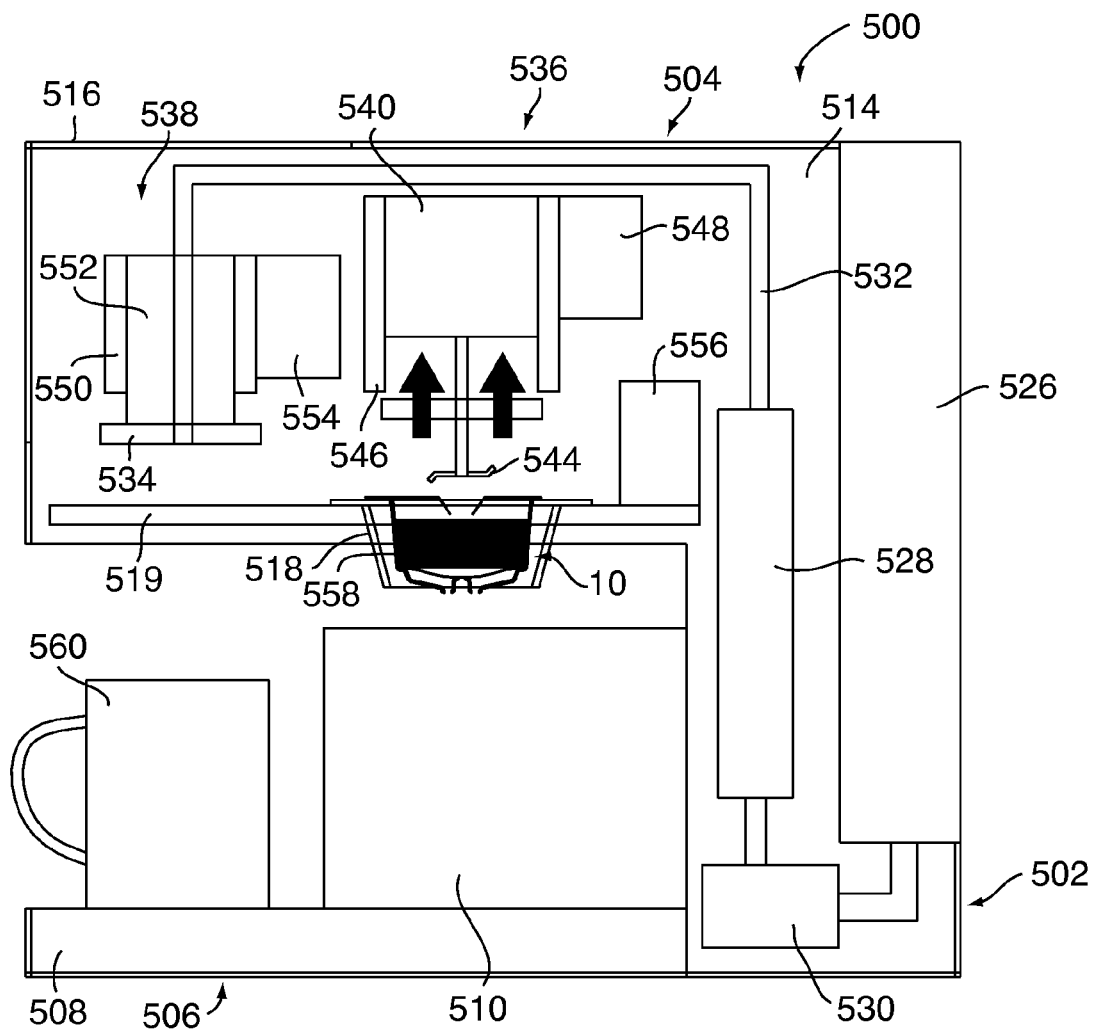
FIG. 76 is a schematic view of the coffee appliance of FIG. 71, in a sixth mode of operation.
Figure 77:
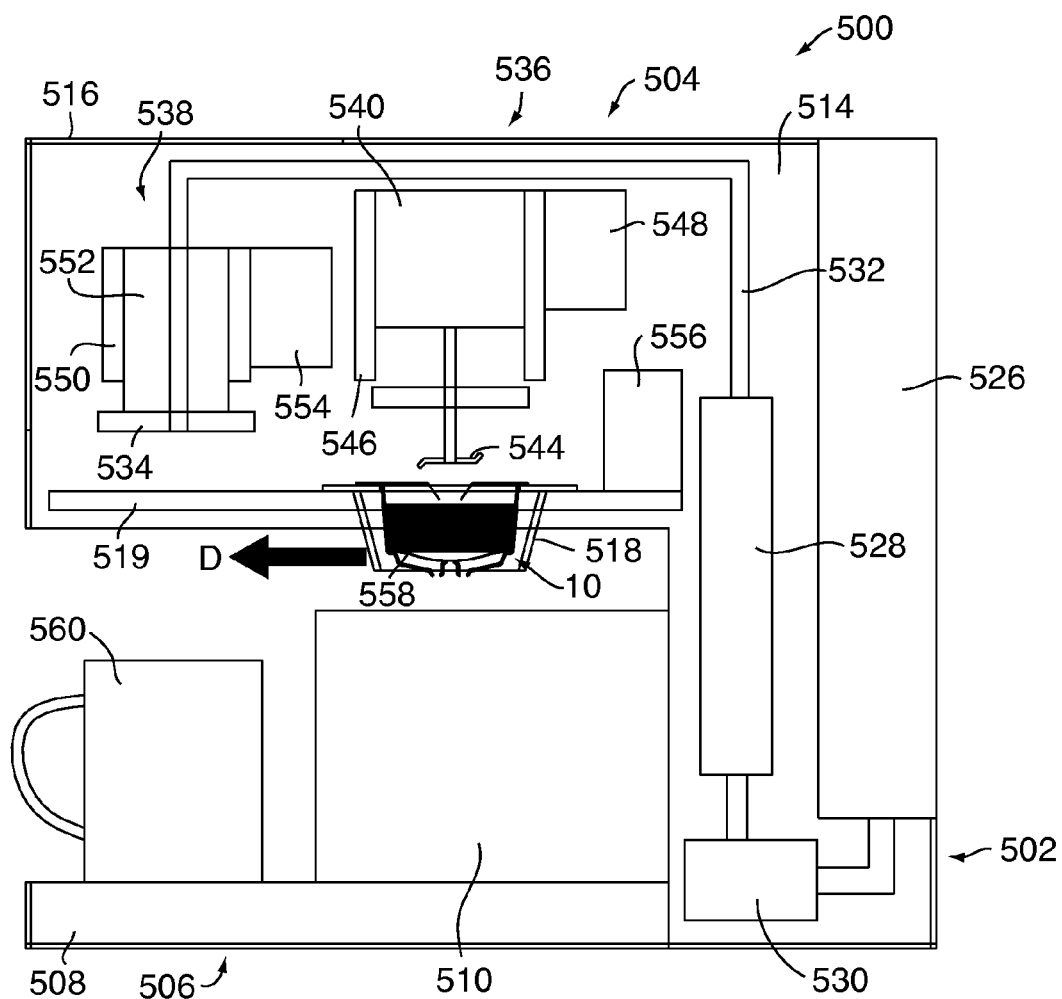
FIG. 77 is a schematic view of the coffee appliance of FIG. 71, in a seventh mode of operation.
Figure 78:
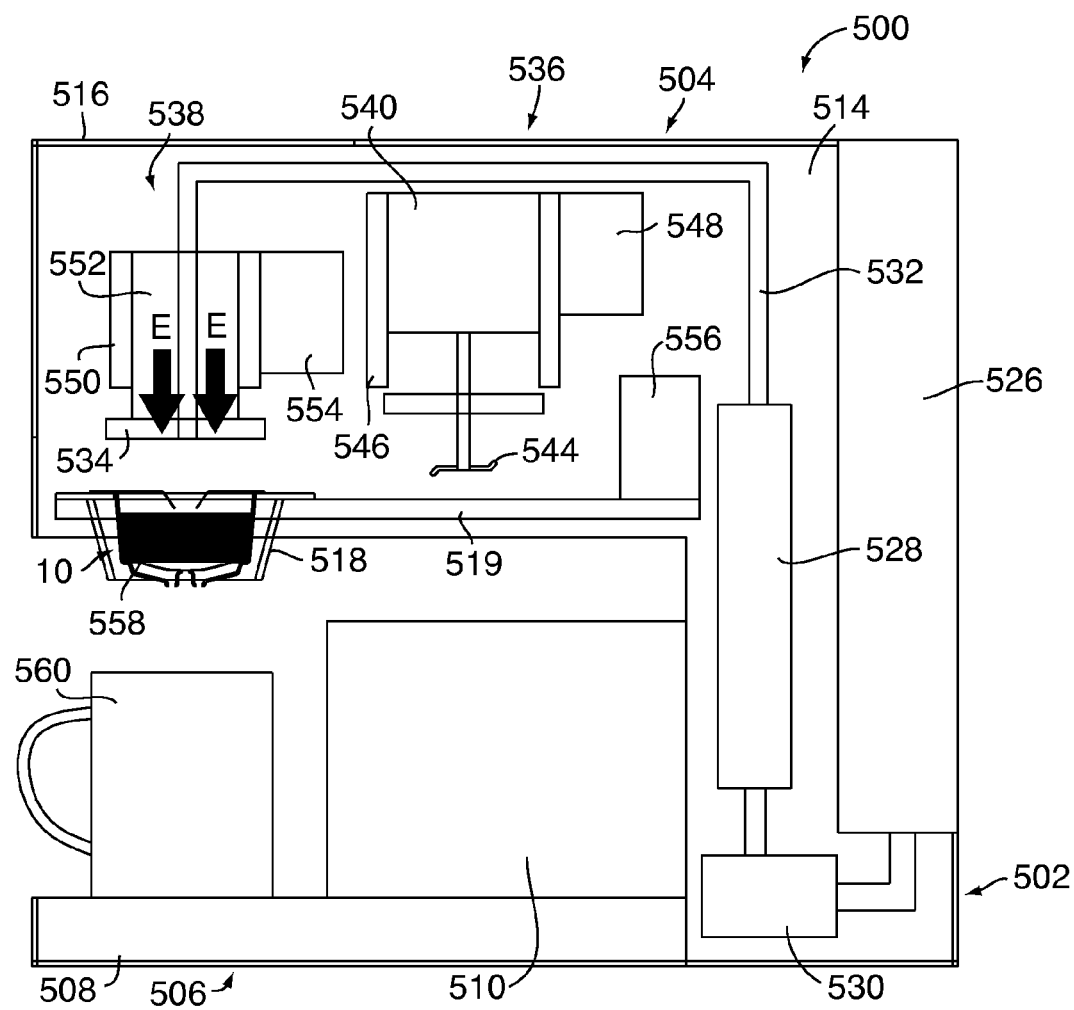
FIG. 78 is a schematic view of the coffee appliance of FIG. 71, in an eighth mode of operation.

Referring now to FIG. 76, once the coffee beans 20 have been transformed into coffee grounds 558, the grinding motor 540 and grinding blade 544 are retracted from the filter cup 10 by way of motor 548. After the grinding blade 544 has been retracted from the cup 10, the track motor 556 is again switched on to move the brewing carriage 518 in the direction of arrow D to the brewing position beneath the brewing station 538. FIG. 78 illustrates the filter cup 10 and brewing carriage 518 in the brewing position.

As further shown in FIG. 78, the brewing station motor 554 is switch on to move the piston 552 and shower head 534 downwards towards the filter cup 10 in the direction of arrow E. in an embodiment, the shower head 534 may be moved into close association with the filter cup 10 to dispense heated water into the filter cup 10, i.e., low pressure brewing. In another embodiment, the shower head 534 may include a seal ring, such as an O-ring. In this embodiment, the shower head 534 is moved downwards until the seal ring pressingly contacts the upper rim of the filter cup 10 to create an air-tight seal. The filter cup 10 may then be pressurized during the brewing step, as discussed in connection with the appliance 100.

In either embodiment, after the shower head 534 is moved into the position shown in FIG. 79, the pump 530 pumps water reservoir 526 through the boiler 528, which heats the water to a predetermined temperature. The water then continues from the boiler 528, through the supply conduit 532 and to the water outlet/shower head 534. The hot water is then passed through the filter cup 10 and the coffee grounds 558 therein to produce brewed coffee. The brewed coffee exits the filter cup 10 through the apertures 32 in the floor 26 thereof, exits the brewing carriage 518 through the aperture 522 in the bottom thereof, and collects in a coffee cup 560 positioned on the drip tray 508.

Next, an optional post-brewing step includes purging the system to blow out any remaining water in the lines. In the purging step, near or at the end of the brewing step, the pump 530 will stop prior to the heater(s) of the boiler 528 being switched off. This results in the excess water remaining in the boiler 528 being converted to steam. The steam then travels through the supply conduit 532 and forces out the hot water in the brewing subassembly (conduit 532, shower head 534, etc.) and filter cup 10. As will be readily appreciated, this ensures that substantially all of the coffee in the cup 10 exits without substantial dripping. In addition, this also ensures that the cup 10 is dry and does not drip when it is removed for disposal.

Figure 80:
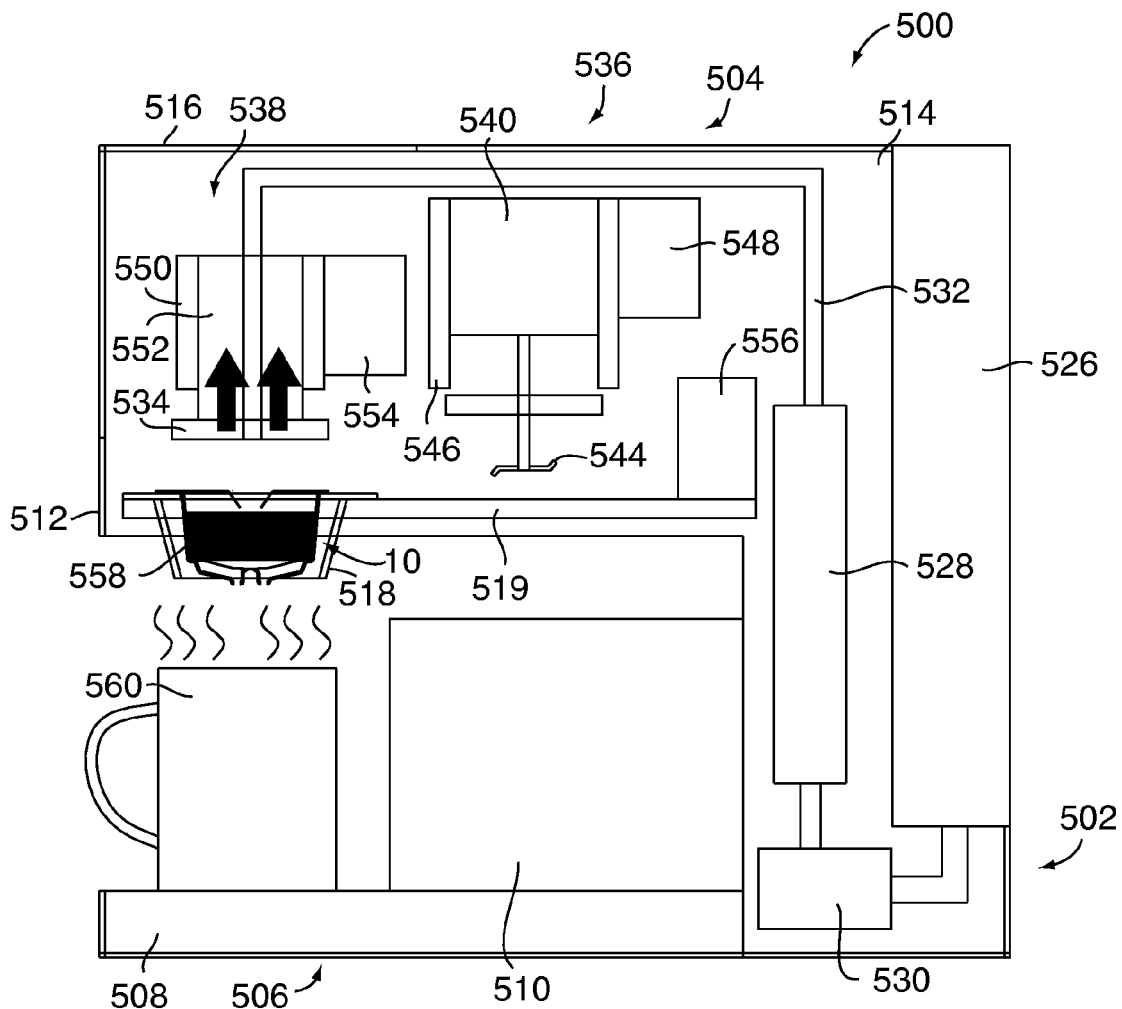
FIG. 80 is a schematic view of the coffee appliance of FIG. 71, in a tenth mode of operation.
Figure 81:
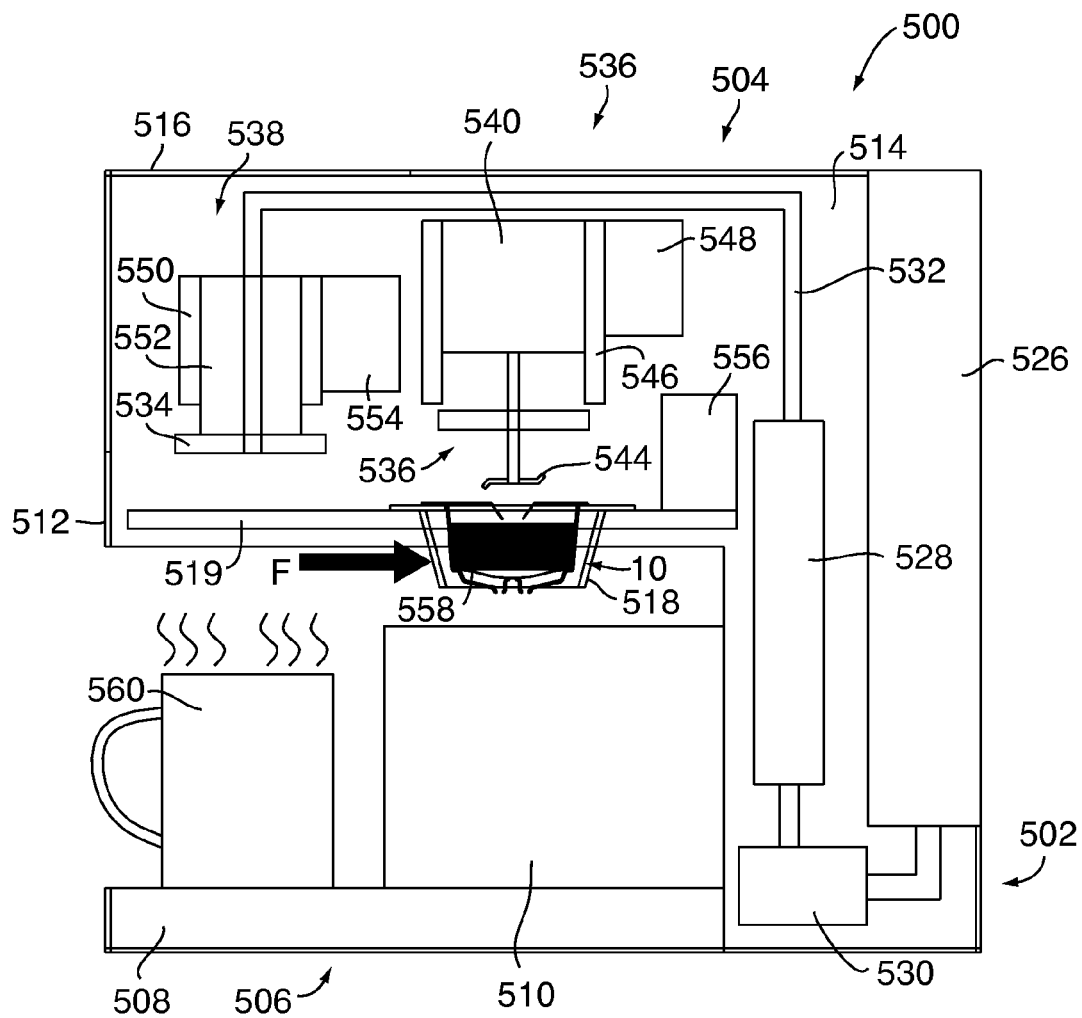
FIG. 81 is a schematic view of the coffee appliance of FIG. 71, in an eleventh mode of operation.
Figure 82:
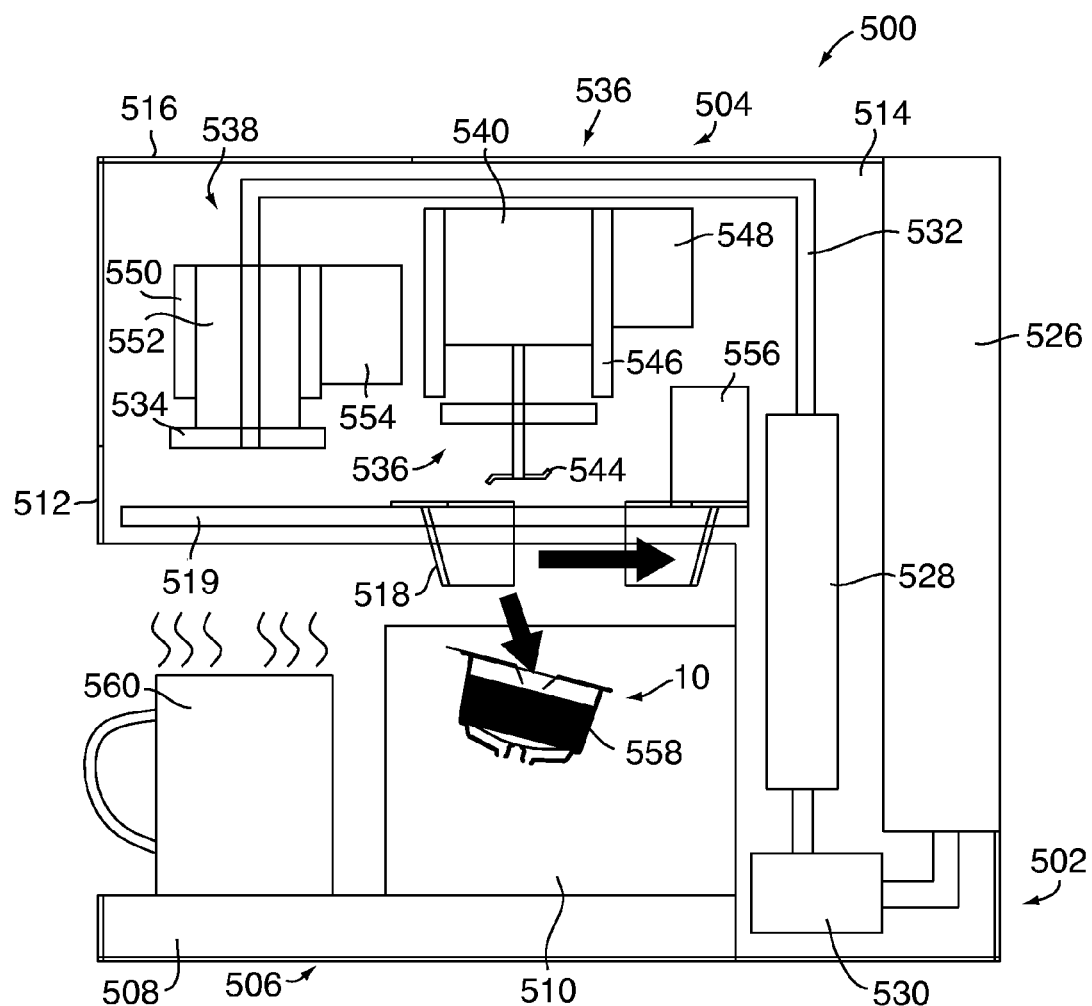
FIG. 82 is a schematic view of the coffee appliance of FIG. 71, in a twelfth mode of operation.

Referring now to FIG. 80, once the coffee mug 560 has been filled with brewed coffee and the brewing process is completed, the piston 552 and shower head 534 retract within the cylindrical sleeve 550 by way of motor 554. After the shower head has been retracted to the position shown in FIGS. 80 and 81, the track motor 556 is once again actuated to move the brewing carriage 518 and used filter cup towards the brewing station 536, in the direction of arrow F, to a disposal position. After moving a predetermined distance, the brewing carriage 518 separates in half, as shown in FIG. 82, such that the used filter cup 10 drops out of the carriage 518 and into the discard bin 510. In an embodiment, upon moving a predetermined distance, a spur may engage a projection on the brewing carriage 518 such that movement of the trailing half of the carriage 518 is stopped while the forward half carrier on and the carriage is separated. Other mechanisms for separating the brewing carriage may also be utilized without departing from the broader aspects of the present invention. Optionally, the shower head 534 and components adjacent the shower head may be cleaned between uses.

While the preferred embodiment contemplates the use of the coffee appliance 500 with a filter cup 10 containing whole coffee beans 20, the present invention is not intended to be limited in this regard. In particular, the coffee appliance 500 may be utilized with a filter cup 10 or other similar cup containing drink ingredients of any type.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A beverage appliance, comprising:
a housing, said housing including a liquid reservoir;
a brewing station disposed within said housing and in fluid communication with said liquid reservoir;
a grinding station disposed within said housing, said grinding station being functionally separate from said brewing station; and
a brewing carriage configured to receive a beverage ingredient having particles of a first size, said brewing carriage being selectively movable between a first position adjacent said grinding station and a second position adjacent said brewing station;
wherein movement of said brewing carriage between said first and second position shifts said beverage ingredient in said brewing carriage from said first position to said second position;
wherein said grinding station includes a mechanism for transforming said particles of said beverage ingredient from said first size to a second size within said brewing carriage when said brewing carriage is in said first position, said second size being smaller than said first size; and
wherein when in said second position, liquid is dispensed from said liquid reservoir and directed to said brewing carriage.

2. The beverage appliance of claim 1, wherein:
said particles of said first size of said beverage are whole coffee beans.

3. The beverage appliance of claim 1, wherein:
said mechanism is a grinding blade rotatably driven by a motor.

4. The beverage appliance of claim 3, wherein:
said grinding blade and said motor are selectively movable towards and away from said brewing carriage when said brewing carriage is in said first position.

5. The beverage appliance of claim 1, further comprising:
a linearly movable track; and
a motor operatively connected to said linearly movable track;
wherein said brewing carriage is operatively connected to said linearly movable track; and
wherein actuation of said motor causes said brewing carriage to move between said brewing station and said grinding station on said linearly movable track.

6. The beverage appliance of claim 1, wherein:
said brewing station includes a liquid outlet, said liquid outlet being movable towards and away from said brewing carriage when said brewing carriage is in said second position.

7. The beverage appliance of claim 1, further comprising:
a pump for pumping water from said liquid reservoir and directing it to said liquid outlet; and
a boiler for heating said water received from said pump.

8. The beverage appliance of claim 1, wherein:
said brewing carriage includes a first half and a second half, said second half being separable from said first half upon movement of said brewing carriage from said brewing station to said grinding station.

9. A beverage appliance, comprising:
a housing, said housing including a liquid reservoir;
a brewing carriage dimensioned to receive a container containing at least one drink ingredient having particles of a first size;
a grinding mechanism positioned in said housing and movable between a retracted position in which said grinding mechanism is disposed above said brewing carriage, and an extended position in which said grinding mechanism penetrates said container in said brewing carriage and transforms said particles of said drink ingredient from said first size to a second size within said brewing carriage, said second size being smaller than said first size; and
a liquid outlet spaced laterally from said grinding mechanism, said liquid outlet being movable between a retracted position in which said liquid outlet is spaced from said brewing carriage, and an extended position in which said liquid outlet is in close association with said brewing carriage.

10. The beverage appliance of claim 9, wherein:
said brewing carriage is received on a linearly movable track.

11. The beverage appliance of claim 9, wherein:
said particles of said at least one drink ingredient are whole coffee beans.

* * * * *